(12) United States Patent
Inao et al.

(10) Patent No.: US 6,873,126 B2
(45) Date of Patent: Mar. 29, 2005

(54) MOTOR DRIVE METHOD AND MOTOR DRIVER

(75) Inventors: Masashi Inao, Kyoto (JP); Yasunori Yamamoto, Osaka (JP); Taishi Iwanaga, Kyoto (JP); Tomoharu Yokouchi, Osaka (JP); Hirofumi Sakai, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/608,157

(22) Filed: Jun. 30, 2003

(65) Prior Publication Data

US 2004/0000884 A1 Jan. 1, 2004

(30) Foreign Application Priority Data

Jul. 1, 2002 (JP) ........................................ 2002-192540

(51) Int. Cl.⁷ ............................................... H02K 23/00
(52) U.S. Cl. ........................ 318/254; 318/138; 318/439; 318/700; 318/727
(58) Field of Search ................................. 318/138, 254, 318/434, 700, 727

(56) References Cited

U.S. PATENT DOCUMENTS

2002/0195981 A1    12/2002   Sakai et al.
2003/0020429 A1 *   1/2003   Masaki et al. ............... 318/727
2003/0030404 A1 *   2/2003   Iwaji et al. ................. 318/700

FOREIGN PATENT DOCUMENTS

JP          11-18474          1/1999

* cited by examiner

Primary Examiner—Karen Masih
(74) Attorney, Agent, or Firm—McDermott Will & Emery LLP

(57) ABSTRACT

A motor drive method for a motor driver having output circuits each including upper and lower side switching elements connected in series, and a current detection resistance connected in series with the output circuits in common. The motor drive method includes the steps of: turning ON a switching element on one side of one of the output circuits for a time period corresponding to a predetermined electrical angle; and repeatedly switching switching elements on the other side of a plurality of output circuits among the remaining ones of the output circuits. In the switching step, each of a plurality of periods obtained by dividing the time period corresponding to the predetermined electrical angle includes a first period in which one of the switching elements to be switched is turned ON and a second period in which another one of the switching elements is turned ON.

9 Claims, 20 Drawing Sheets

MOTOR DRIVE METHOD AND MOTOR DRIVER

BACKGROUND OF THE INVENTION

The present invention relates to motor drive technology, and more particularly, to a motor drive technology of a pulse width modulation (PWM) system.

As PWM drive systems for a brushless motor, a triangular wave slicing system and a peak current detecting system are known. In the triangular wave slicing system, a coil current is made to flow through a detection resistance, and the difference between a voltage generated at the detection resistance and a torque command voltage is output as a slice level by an error amplifier. A triangular wave having a constant period is sliced with the slice level, to determine the time period (ON period) during which the current flows to the coil. In the peak current detecting system, which uses no error amplifier, supply of a current to a coil is halted when the voltage generated at the current detection resistance, through which the coil current flows, reaches the torque command voltage, and a regenerative current mode is started.

FIG. 18 is a block diagram of a conventional motor driver of the peak current detecting method. Referring to FIG. 18, Hall sensors 21A, 21B and 21C detect the position of a rotor of a motor 10 and output the detection results to a position detection circuit 22 as Hall sensor outputs S11, S12 and S13, respectively. The position detection circuit 22 determines position signals S21, S22 and S23 based on the Hall sensor outputs S11, S12 and S13, respectively, and outputs the signals to a phase switch circuit 93. The position signals S21, S22 and S23 are signals obtained by shifting the phase of the Hall sensor outputs S11, S12 and S13 by 30°.

The phase switch circuit 93 determines the phases of currents to pass according to the position signals S21, S22 and S23. For easy measurement of the phase currents, the phase switch circuit 93 blocks flow of one of three phase currents. A Logic control circuit 95, set upon receipt of a reference pulse PI, controls supply of currents to the motor 10 by changing the level of signals output to the phase switch circuit 93. The reference pulse PI is a periodical pulse.

FIG. 19 is a graph showing changes with time of phase currents for the motor driven by the motor driver of FIG. 18. In FIG. 19, phase currents I1, I2 and I3 in U, V and W phases, respectively, are shown, and currents flowing from drive transistors 1 to 6 toward the motor 10 are considered positive. As is found from FIG. 19, there is always one phase current that becomes zero, and thus there occurs sharp change of any of the phase currents every electrical angle of 60°.

Assume that the logic control circuit 95 has been set with the reference pulse PI. The phase switch circuit 93 turns ON only the W-phase upper side drive transistor 5 and the U-phase lower side drive transistor 2, for example. In this state, a current flows to a current detection resistance 7 via a W-phase coil 13 and a U-phase coil 11. The magnitude of this current can therefore be detected as the voltage generated at the current detection resistance 7. Since this current flows through the inductive coils, the current gradually increases after the conduction of the drive transistors 2 and 5.

With increase of the current, the voltage generated at the current detection resistance 7 increases, and when it reaches a torque command voltage TI, the level of the output of a comparator 96 changes, causing the logic control circuit 95 to be reset. The reset logic control circuit 95 reverses the level of a signal output to the phase switch circuit 93. On receipt of this signal, the phase switch circuit 93 turns OFF the drive transistor 2.

The time period from the setting of the logic control circuit 95 until the reset thereof corresponds to the "on" period of switching operation. After the reset of the logic control circuit 95, the current flowing through the coils 11 and 13 still attempts to continue the flow, and this causes a regenerative current to flow through a diode 1D existing between the source and drain of the drive transistor 1. Since the regenerative current does not pass through the current detection resistance 7, the voltage generated at the current detection resistance 7 is zero during the flow of the regenerative current.

The regenerative current gradually decreases. However, upon receipt of the reference pulse PI, the logic control circuit 95 is set again, and the phase switch circuit 93 turns ON the drive transistor 2. This operation is repeated until the phase switch circuit 93 switches the phases of currents to pass. In this way, as a result of the alternate flow of the drive current flowing when the logic control circuit 95 is set and the regenerative current flowing when the logic control circuit 95 is reset, a phase current roughly corresponding to the torque command voltage TI is allowed to flow through a predetermined coil.

FIG. 20 is a graph showing the current detection resistance voltage (motor current detection signal) MC and the V-phase and W-phase currents I2 and I3 at and around time t=tz in FIG. 19, obtained by enlarging the time axis. In FIG. 20, a period T91 is a time period during which a drive current of the U-phase and V-phase currents flows. This drive current flows through the current detection resistance 7. A period T92 is a time period during which the U-phase and V-phase currents flow as a regenerative current. A period T93 is a time period during which a drive current of the U-phase and W-phase currents flows. This drive current flows through the current detection resistance 7. A period T94 is a time period during which the U-phase and W-phase currents flow as a regenerative current.

The conventional motor driver shown in FIG. 18 has the following problem. The phase currents sharply change as shown in FIG. 19. For this reason, when the phase currents are switched, vibration of the motor and generation of electromagnetic noise tend to occur.

To avoid the above problem, the phase currents may be controlled not to change sharply. However, to detect and control a plurality of phase currents, it is necessary to provide current detection resistances in the same number as the number of phases. It is difficult to incorporate the current detection resistances in an integrated circuit. Therefore, as the number of the current detection resistances is greater, the scale of the device is larger and the cost is higher.

In addition, the properties of resistances generally have variations. Therefore, in the case of using current detection resistances for the respective phases, the current detection properties vary every phase. For example, when two phase currents are actually the same in magnitude, the magnitudes of the detected currents may sometimes be different from each other.

SUMMARY OF THE INVENTION

An object of the present invention is driving a motor by controlling a plurality of phase currents not to change sharply, using current detection resistances smaller than the phase currents in number, to reduce vibration of the motor and electromagnetic noise.

Specifically, an inventive motor drive method is for a motor driver which has a plurality of output circuits each including an upper side switching element and a lower side switching element connected in series, and a current detection resistance connected in series with the plurality of output circuits in common for detecting a current supplied to the plurality of output circuits and which supplies a current to a motor from a connection point between the upper side switching element and the lower side switching element of each of the output circuits. The motor drive method includes the steps of: determining a position signal corresponding to the position of a rotor of the motor; selecting one switching element of one of the plurality of output circuits according to the position signal and turning ON the selected switching element for a time period corresponding to a predetermined electrical angle; and repeatedly switching lower side switching elements of a plurality of output circuits among the remaining ones of the plurality of output circuits when the selected switching element is an upper side switching element, while repeatedly switching upper side switching elements of a plurality of output circuits among the remaining ones of the plurality of output circuits when the selected switching element is a lower side switching element, wherein in the switching step, the switching operation is controlled according to an input torque command signal and a voltage generated at the current detection resistance so that each of a plurality of periods obtained by dividing the time period corresponding to the predetermined electrical angle includes a first period in which one of the switching elements to be switched is turned ON and a second period in which another one of the switching elements is turned ON.

According to the invention, there are provided the first period in which a switching element is turned ON and the second period in which another switching element is turned ON. Therefore, phase currents equal to or larger than the current detection resistance in number can be controlled. This enables PWM control with no variation in magnitude of the phase currents. In addition, the phase currents are avoided from sharp change, and thus vibration of the motor and electromagnetic noise during the phase switch can be reduced.

Another motor drive method is for a motor driver which has an even number of output circuits that is four or more each including an upper side switching element and a lower side switching element connected in series, and a current detection resistance connected in series with the output circuits in common for detecting a current supplied to the output circuits, and which supplies a current to a motor from a connection point between the upper side switching element and the lower side switching element of each of the output circuits. The motor drive method includes the steps of: determining a position signal corresponding to the position of a rotor of the motor; selecting one switching element of one of the output circuits according to the position signal, and, for a time period corresponding to a predetermined electrical angle, turning ON a pair of the selected switching element and a lower side switching element of the output circuit corresponding to a phase opposite to a phase corresponding to the output circuit including the selected switching element when the selected switching element is an upper side switching element, while turning ON a pair of the selected switching element and an upper side switching element of the output circuit corresponding to a phase opposite to a phase corresponding to the output circuit including the selected switching element when the selected switching element is a lower side switching element; and repeatedly switching each pair of any one of the lower side switching elements of a plurality of output circuits among the remaining ones of the output circuits and the upper side switching element corresponding to a phase opposite to a phase corresponding to the output circuit including said one lower side switching element when the selected switching element is an upper side switching element, while repeatedly switching each pair of any one of the upper side switching elements of a plurality of output circuits among the remaining ones of the output circuits and the lower side switching element corresponding to a phase opposite to a phase corresponding to the output circuit including said one upper side switching element when the selected switching element is a lower side switching element, wherein in the switching step, the switching operation is controlled according to an input torque command signal and a voltage generated at the current detection resistance so that each of a plurality of periods obtained by dividing the time period corresponding to the predetermined electrical angle includes a first period in which one pair of the switching elements are turned ON and a second period in which another pair of the switching elements are turned ON.

In the switching step of the motor drive method, the first period is preferably started when a reference pulse is input, and is preferably terminated when the voltage generated at the current detection resistance reaches a target signal.

In the switching step of the motor drive method, upon receipt of the reference pulse, the first period is preferably started after all the switching elements to be switched have been turned OFF.

Still another motor drive method is for a motor driver which has a plurality of output circuits each including an upper side switching element and a lower side switching element connected in series, and a current detection resistance connected in series with the plurality of output circuits in common for detecting a current supplied to the plurality of output circuits, and which supplies currents to motor coils of a plurality of phases from a connection point between the upper side switching element and the lower side switching element of each of the output circuits. In this method, a period in which respective phase motor currents for the motor coils of the plurality of phases flow simultaneously is divided into pulse width modulation (PWM) control periods, and in each of the PWM control periods, a PWM control is performed by providing said each of the PWM control periods with a period in which the switching elements are selectively turned ON until a signal corresponding to the value of a current flowing each of the switching elements coincides with a signal obtained from the current detection resistance such that a current flowing through the current detection resistance is the same as a current passing through specific one of the upper and lower switching elements, and a period in which phase currents for phases other than a phase relating to the specific switching element are made in regenerative states.

An inventive motor driver having a plurality of output circuits each including an upper side switching element and a lower side switching element connected in series, for supplying a current to a motor from a connection point between the upper side switching element and the lower side switching element of each output circuit, includes: a current detection resistance connected in series with the plurality of output circuits in common for detecting a current supplied to the plurality of output circuits; a position detection section for outputting a position signal corresponding to the position of a rotor of the motor; a phase switch circuit for selecting one switching element of one of the plurality of output circuits according to the position signal and turning ON the selected switching element for a time period corresponding to a predetermined electrical angle, and repeatedly switching lower side switching elements of a plurality of output circuits among the remaining ones of the plurality of output circuits when the selected switching element is an upper side switching element, while repeatedly switching upper side switching elements of a plurality of output circuits among the remaining ones of the plurality of output circuits when the selected switching element is a lower side switching element; and an ON-period control section for generating a switching control signal for controlling the switching operation by the phase switch circuit according to an input torque command signal and a voltage generated at the current detection resistance so that each of a plurality of periods obtained by dividing the time period corresponding to the predetermined electrical angle includes a first period in which one of the switching elements to be switched is turned ON and a second period in which another one of the plurality of switching elements is turned ON, and outputting the generated signal.

In the motor driver, the ON-period control section preferably includes: a torque signal generation circuit for obtaining, according to the torque command signal and the position signal, a first target signal corresponding to a target value of a current that should flow to the current detection resistance during the first period and a second target signal corresponding to a target value of a current that should flow to the current detection resistance during the second period, and outputting the target signals; a first comparator for determining whether or not the voltage generated at the current detection resistance exceeds the first target signal and outputting the result; a second comparator for determining whether or not the voltage generated at the current detection resistance exceeds the second target signal and outputting the result; and a logic control circuit for generating the switching control signal according to a reference pulse for defining the period of the switching operation and the outputs of the first and second comparators and outputting the generated signal. The logic control circuit preferably generates the switching control signal so that the first period is terminated when the first comparator determines that the voltage generated at the current detection resistance has exceeded the first target signal and that the second period is terminated when the second comparator determines that the voltage generated at the current detection resistance has exceeded the second signal, and preferably outputs the generated signal.

DESCRIPTION OF THE PREFERRED EMBODIMENTS

Hereinafter, preferred embodiments of the present invention will be described with reference to the accompanying drawings. In the following embodiments, the case where a motor driver drives a three phase brushless motor will be described as an example.

Embodiment 1

Figure 1:
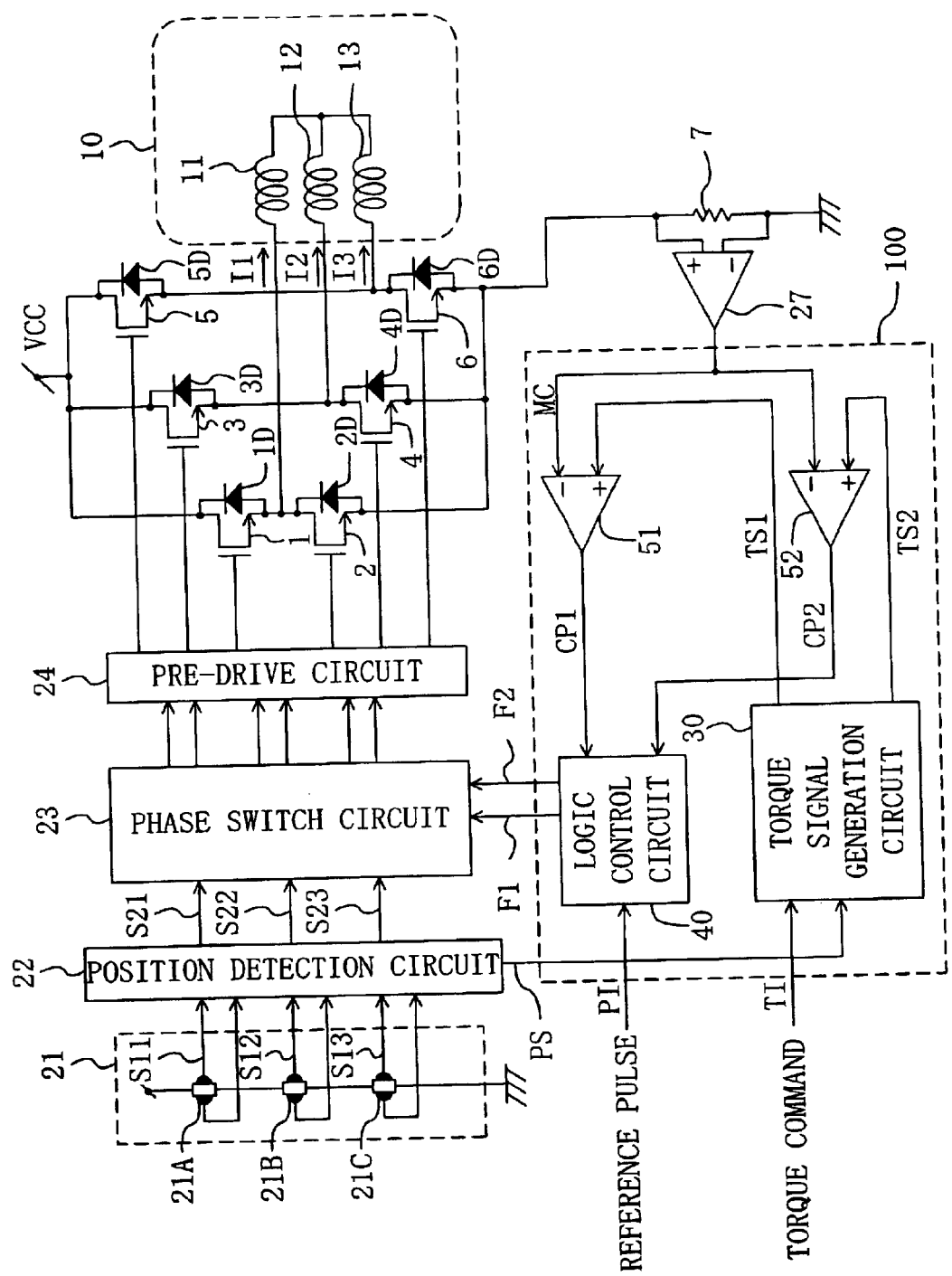
FIG. 1 is a block diagram of a motor driver according to a first embodiment of the present invention.

FIG. 1 is a block diagram of a motor driver of the first embodiment of the present invention. The motor driver of FIG. 1 includes U-phase, V-phase and W-phase upper side drive transistors 1, 3 and 5, U-phase, V-phase and W-phase lower side drive transistors 2, 4 and 6, diodes 1D, 2D, 3D, 4D, 5D and 6D, a current detection resistance 7, a Hall sensor circuit 21, a position detection circuit 22, a phase switch circuit 23, a pre-drive circuit 24, an amplifier 27, a torque signal generation circuit 30, a logic control circuit 40 and comparators 51 and 52. A motor 10 includes a U-phase coil 11, a V-phase coil 12 and a W-phase coil 13. The torque signal generation circuit 30, the logic control circuit 40 and the comparators 51 and 52 constitute an ON-period control section 100. The Hall sensor circuit 21 and the position detection circuit 22 constitute a position detection section.

N-type metal oxide semiconductor (MOS) transistors are used as the drive transistors 1 to 6 in this embodiment. The anode and cathode of the diode 1D are connected to the source and drain of the drive transistor 1, respectively. Likewise, the diodes 2D to 6D are connected to the drive transistors 2 to 6, respectively, in the same manner. The drains of the drive transistors 1, 3 and 5 are connected to the power supply VCC, and the sources of the drive transistors 2, 4 and 6 are connected to one terminal of the current detection resistance 7. The other terminal of the current detection resistance 7 is grounded. The drive transistors 1 to 6 operate as switching elements.

The drive transistors 1 and 2 and the diodes 1D and 2D operate as a U-phase output circuit (half-bridge circuit), the drive transistors 3 and 4 and the diodes 3D and 4D operate as a V-phase output circuit, and the drive transistors 5 and 6 and the diodes 5D and 6D operate as a W-phase output circuit. The current supplied from the power supply VCC to these output circuits flows to the current detection resistance 7.

The source of the drive transistor 1 is connected to the drain of the drive transistor 2 and also connected to one terminal of the U-phase coil 11 of the motor 10. The source of the drive transistor 3 is connected to the drain of the drive transistor 4 and also connected to one terminal of the V-phase coil 12 of the motor 10. The source of the drive transistor 5 is connected to the drain of the drive transistor 6 and also connected to one terminal of the W-phase coil 13 of the motor 10. The other terminals of the U-phase coil 11, the V-phase coil 12 and the W-phase coil 13 are connected to one another.

Herein, the current flowing from the drive transistors 1 and 2 toward the U-phase coil 11 is called a U-phase current I1. Likewise, the current flowing from the drive transistors 3 and 4 toward the V-phase coil 12 is called a V-phase current I2, and the current flowing from the drive transistors 5 and 6 toward the W-phase coil 13 is called a W-phase current I3. Also, currents flowing from the drive transistors 1 to 6 toward the coils 11 to 13 are called source currents, while currents in the opposite direction are called sink currents. The direction of the source currents is assumed as the positive direction for all the phase currents. The coils 11 to 13 of the motor 10 are in Y connection. Therefore, the respective phase currents are equal to currents flowing through the corresponding coils.

The Hall sensor circuit 21 includes Hall sensors 21A, 21B and 21C, which detect the position of a rotor of the motor 10 and output the detection results to the position detection circuit 22 as Hall sensor outputs S11, S12 and S13, respectively. The position detection circuit 22 determines position signals S21, S22, S23 and PS based on the Hall sensor outputs S11, S12 and S13, and outputs the signals S21, S22 and S23 to the phase switch circuit 23 and the signal PS to the torque signal generation circuit 30.

The torque signal generation circuit 30 generates voltage signals TS1 and TS2 corresponding to a target value of a current to flow to the current detection resistance 7 based on the position signal PS and a torque command voltage (torque command signal) TI, and outputs the signals TS1 and TS2 to the positive input terminals of the comparators 51 and 52, respectively. The amplifier 27 is connected to both terminals of the current detection resistance 7, and outputs a motor current detection signal MC according to a voltage generated at the current detection resistance 7 to the negative input terminals of the comparators 51 and 52.

The comparators 51 and 52 supply the respective comparison results of input signals to the logic control circuit 40 as the outputs CP1 and CP2, respectively. The logic control circuit 40, which also receives the reference pulse PI, generates switching control signals F1 and F2 for defining the time period during which the drive transistors 1 to 6 are kept ON, and outputs the signals to the phase switch circuit 23.

The phase switch circuit 23 selects any of the drive transistors 1 to 6 to be turned ON based on the position signals S21, S22 and S23 and the control signals F1 and F2, and sends instructions to the pre-drive circuit 24. The pre-drive circuit 24 outputs signals to the gates of the drive transistors 1 to 6 according to the outputs of the phase switch circuit 23, to control ON/OFF of the drive transistors 1 to 6.

Figure 2:
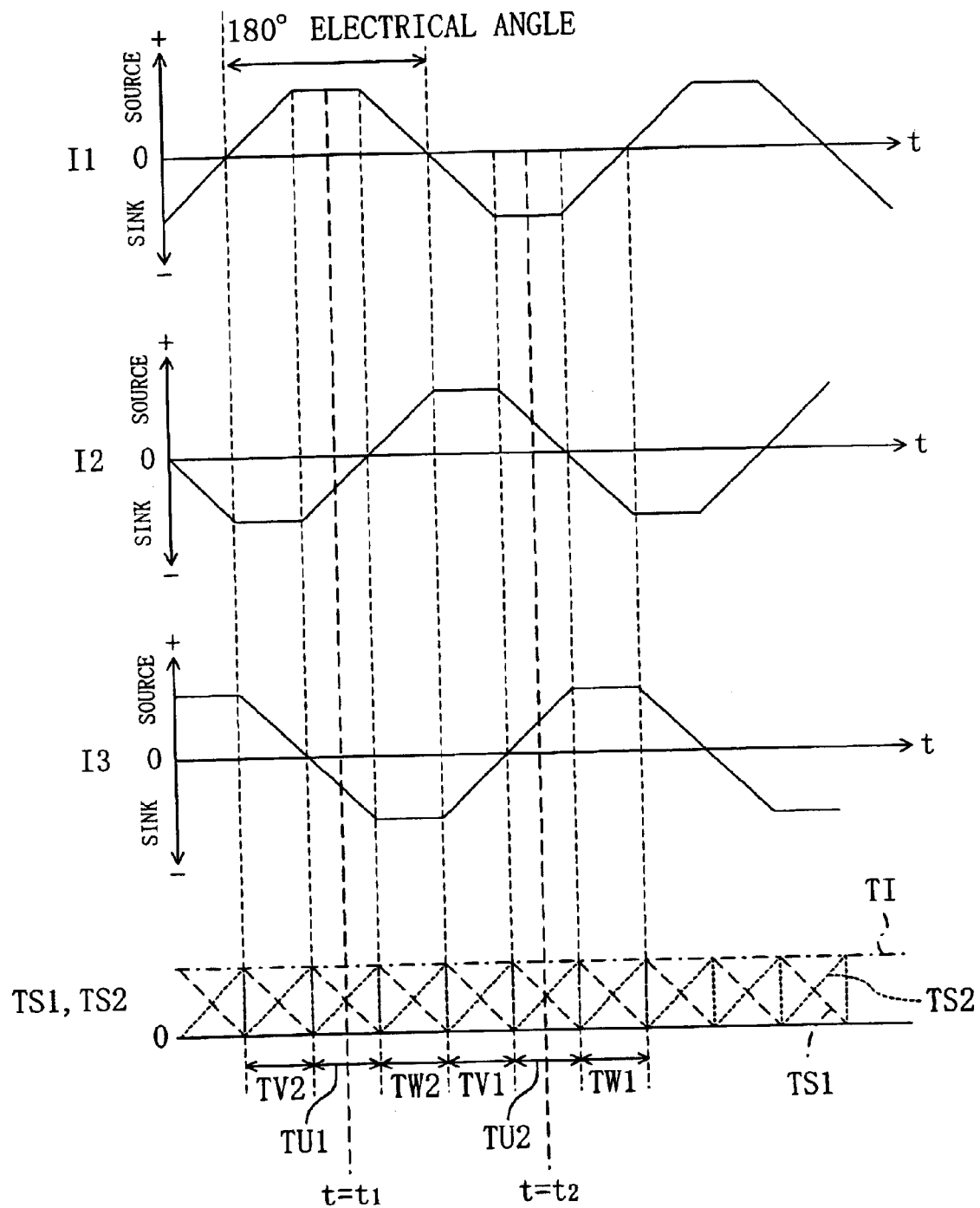
FIG. 2 is a graph showing target waveforms for respective phase currents for a motor in FIG. 1.

FIG. 2 is a graph showing target waveforms for the phase currents I1 to I3 for the motor 10. The motor driver of FIG. 1 controls supply of currents to the motor 10 as shown in FIG. 2 so that the phase currents I1 to I3 for the motor 10 are prevented from sharp change. The motor driver of FIG. 1 divides the electrical angle 360° of the motor 10 into six, for example, and switches the phases of currents to pass every time period corresponding to the divided electrical angle, that is, every rotation of the rotor of the motor 10 by the angle corresponding to the divided electrical angle, to control the currents to the motor 10.

For example, a period TU1 in FIG. 2 is a time period corresponding to the electrical angle 60°. During the period TU1, the U-phase current I1 is a source current having a roughly constant magnitude. The V-phase current I2 is a sink current of which the magnitude gradually decreases with time t. The W-phase current I3 is a sink current of which the magnitude gradually increases with time t. To attain this state, during the period TU1, control is performed as follows. The U-phase upper side drive transistor 1 is continuously kept ON. The V-phase and W-phase lower side drive transistors 4 and 6 are repeatedly switched so that the V-phase current I2 and the W-phase current I3 behave as shown in FIG. 2, controlling the ON/OFF periods of the drive transistors 4 and 6.

Figure 3:
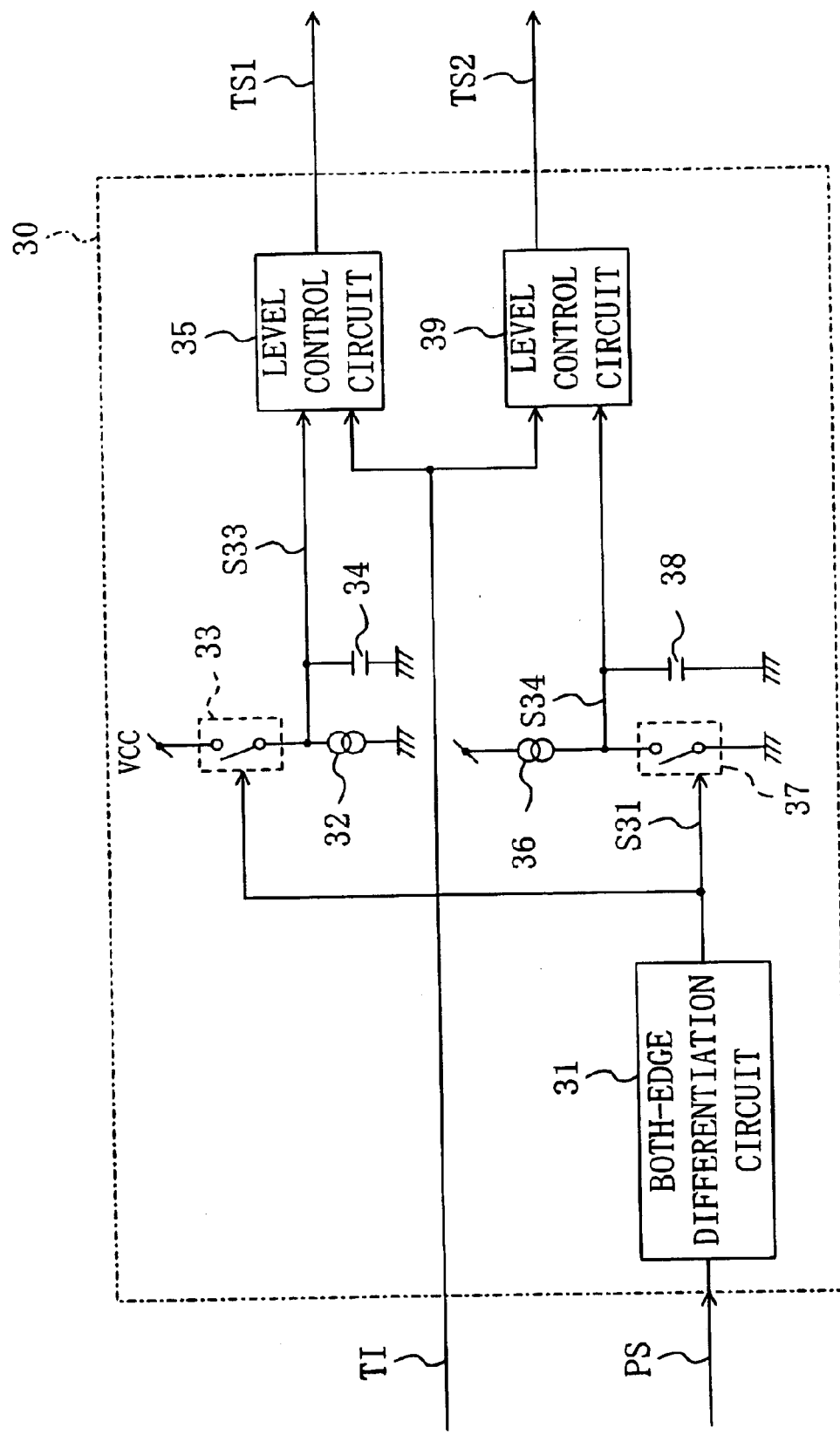
FIG. 3 is a block diagram of an example of a torque signal generation circuit in FIG. 1.

FIG. 3 is a block diagram of an example of the torque signal generation circuit 30 in FIG. 1. The torque signal generation circuit 30 in FIG. 3 includes a both-edge differentiation circuit 31, constant-current sources 32 and 36, switches 33 and 37, capacitors 34 and 38 and level control circuits 35 and 39.

Figure 4:
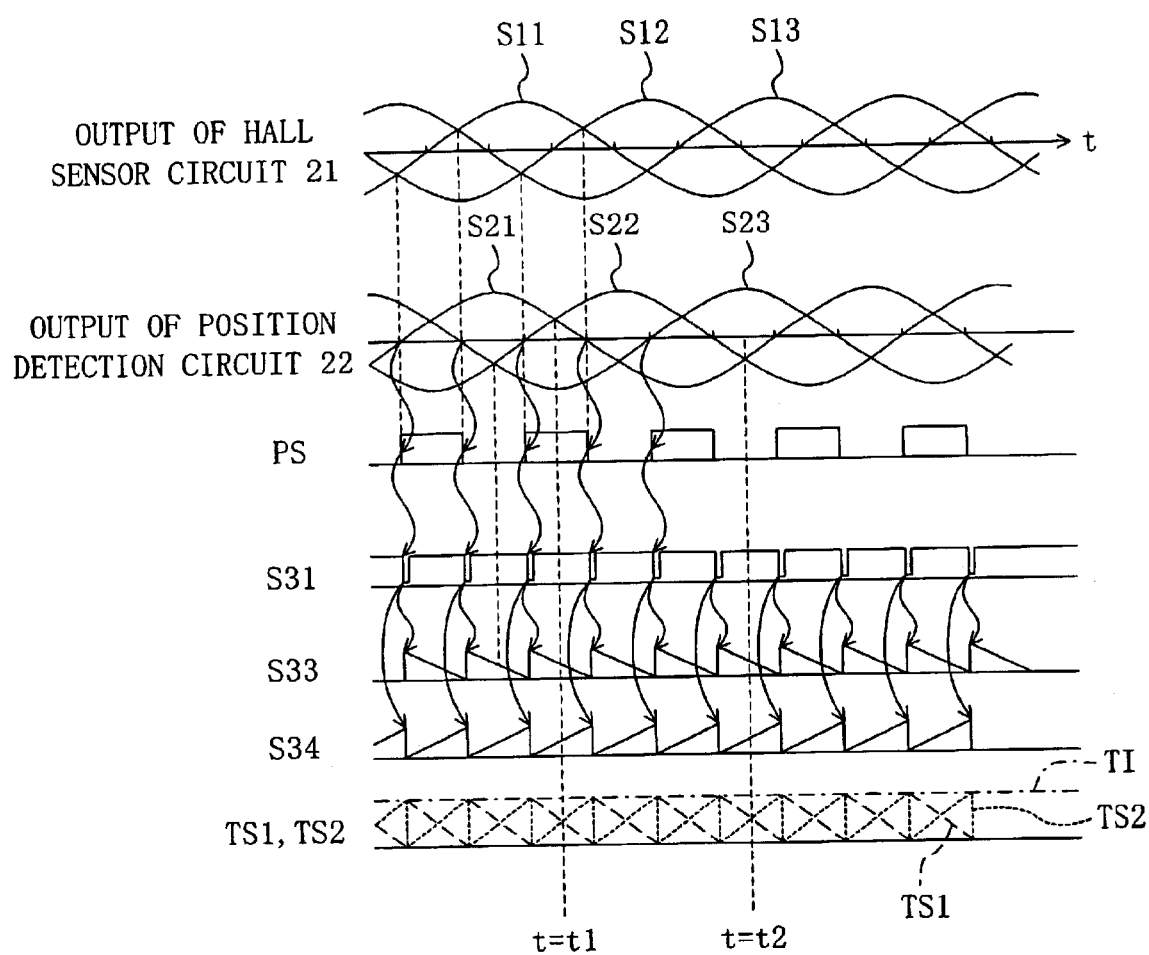
FIG. 4 is a graph showing signals related to a position detection circuit and a torque signal generation circuit.

FIG. 4 is a graph showing signals related to the position detection circuit 22 and the torque signal generation circuit 30. The position detection circuit 22 determines the position signal S21 indicating the position of the rotor of the motor 10 based on the Hall sensor outputs S11 and S12. Herein, assume that the position signal S21 represents the difference between the Hall sensor outputs S11 and S12 (S21=S11−S12). The Hall sensor outputs S11 and S12 are approximate sine waves. When the phase of the Hall sensor output S11 is ahead of that of the Hall sensor output S12 by 120°, the phase of the position signal S21 is ahead of that of the Hall sensor output S11 by 30°. Likewise, the position detection circuit 22 determines the position signals S22 and S23 from S22=S12−S13 and S23=S13−S11, for example.

The position detection circuit 22 determines the position signal PS based on the determined position signals S21, S22 and S23. The position signal PS is a signal having a pulse rising when the position signal S21 changes from negative to positive and falling when the position signal S23 changes from positive to negative, a pulse rising when the position signal S22 changes from negative to positive and falling when the position signal S21 changes from positive to negative, and a pulse rising when the position signal S23 changes from negative to positive and falling when the position signal S22 changes from positive to negative, repeatedly. The timing of the edges of the position signal PS matches with the timing at which the waveforms of the Hall sensor outputs S11, S12 and S13 cross with each other as shown in FIG. 4.

The operation of the torque signal generation circuit 30 will be described with reference to FIGS. 3 and 4. The position signal PS is input into the both-edge differentiation circuit 31 from the position detection circuit 22. The both-edge differentiation circuit 31 outputs a reset pulse signal S31 to the switch 33 as the control signal. The reset pulse signal S31 is kept "L" for a constant time period when an edge of the position signal PS is detected and otherwise kept "H" ("H" and "L" represent logical high and low potentials, respectively).

The capacitor 34 is connected to one terminal of the constant-current source 32 and connected to a power supply VCC via the switch 33 at one terminal, and grounded at the other terminal. The switch 33 is ON only when the reset pulse signal S31 is "L" so that the capacitor 34 is charged. The capacitor 34 discharges with a current output from the constant-current source 32.

The capacitor 38 is connected to the output of the constant-current source 36 and grounded via the switch 37 at one terminal, and grounded at the other terminal. The capacitor 38 is charged with a current output from the constant-current source 36, and the switch 37 is ON only when the reset pulse signal S31 is "L", permitting discharge of the capacitor 38. Thus, voltages S33 and S34 at the capacitors 34 and 38, respectively, have the shape of a sawtooth wave as shown in FIG. 4.

The level control circuit 35 receives the torque command voltage TI and the voltage S33, generates a signal TS1 by multiplying the voltage S33 by a gain so that the peak of the voltage S33 is equal to the torque command voltage TI, and outputs the signal TS1 to the comparator 51 as a first target signal. Likewise, the level control circuit 39 receives the torque command voltage TI and the voltage S34, generates a signal TS2 by multiplying the voltage S34 by a gain so that the peak of the voltage S34 is equal to the torque command voltage TI, and outputs the signal TS2 to the comparator 52 as a second target signal, in the same manner.

Figure 5:
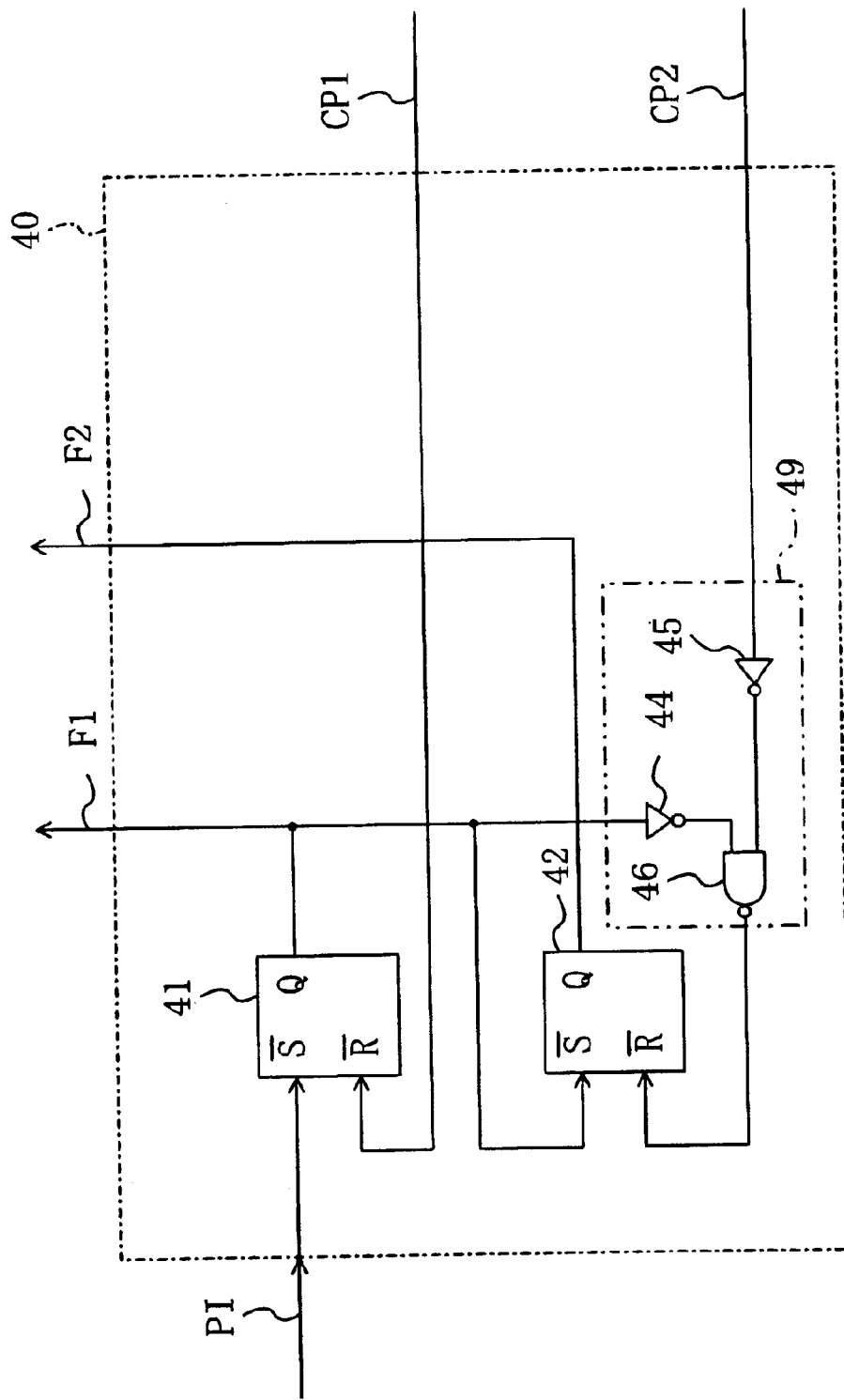
FIG. 5 is a block diagram of an example of a logic control circuit in FIG. 1.
Figure 6:
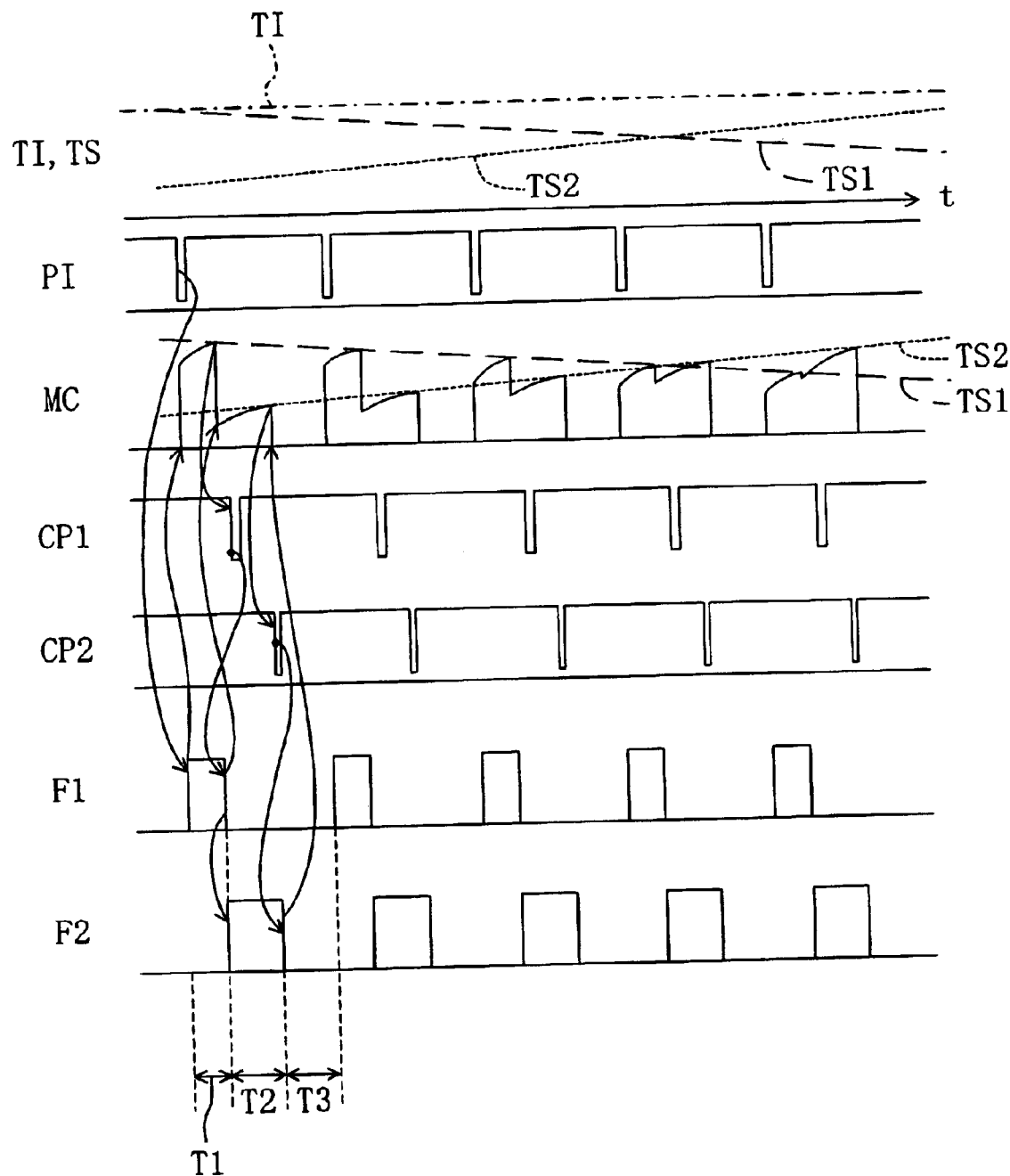
FIG. 6 is a graph showing signals input/output into/from a logic control circuit and a comparator in FIG. 1.
Figure 7:
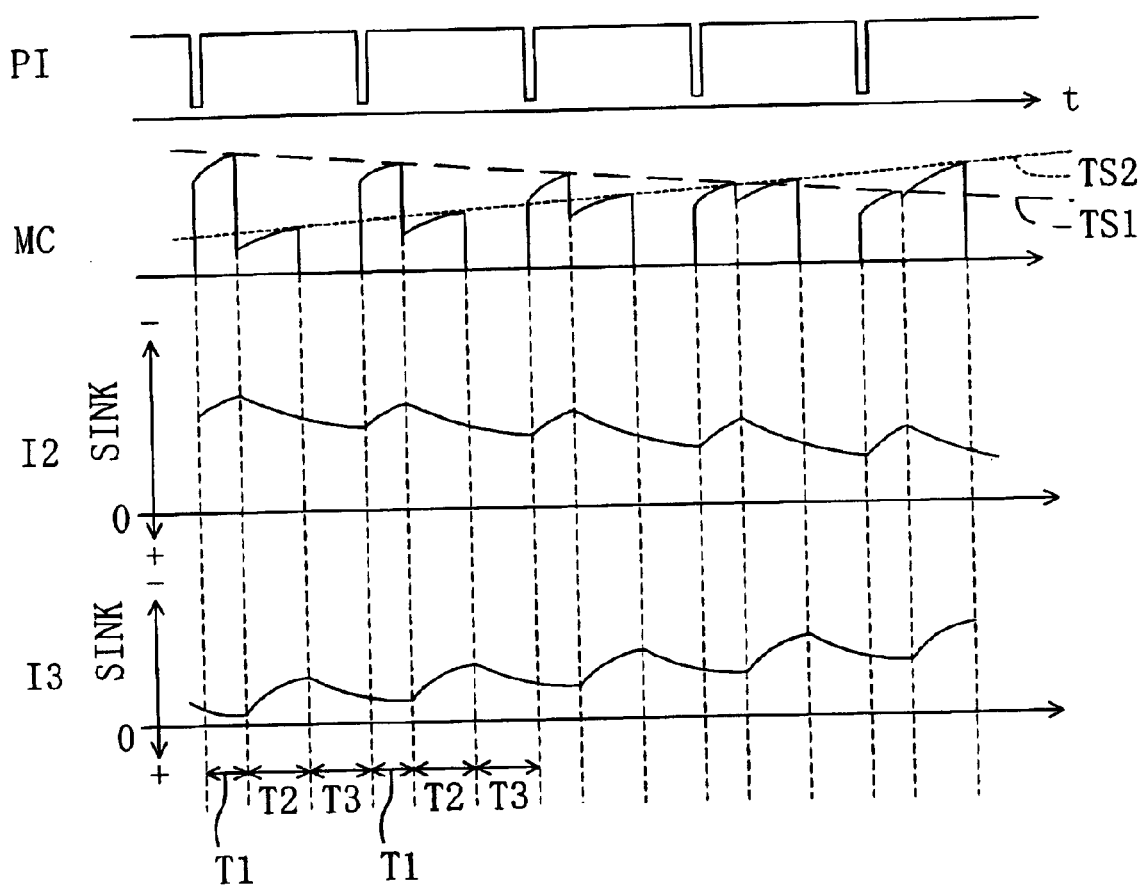
FIG. 7 is a graph showing phase currents in the motor driver of FIG. 1.

FIG. 5 is a block diagram of an example of the logic control circuit 40 in FIG. 1. The logic control circuit 40 in FIG. 5 includes a RS flip-flop 41 as the first latch, a RS flip-flop 42 as the second latch, inverters 44 and 45 and a NAND gate 46. The inverters 44 and 45 and the NAND gate 46 operate as a logic circuit 49. FIG. 6 is a graph of input/output signals for the logic control circuit 40 and the comparators 51 and 52 in FIG. 1. FIG. 7 is a graph showing phase currents in the motor driver of FIG. 1. FIGS. 6 and 7 show areas at and around time t=t1 in FIGS. 2 and 4 in an enlarged manner.

The operation of the logic control circuit 40 and the currents flowing to the motor 10 will be described with reference to FIGS. 5, 6 and 7. As shown in FIG. 6, the reference pulse PI is a pulse signal having a roughly constant period, and this period is the reference period for the PWM control. Respective periods of the reference pulse PI are also referred to as PWM control periods.

The reference pulse PI is input into the set terminals of the RS flip-flops 41 and 42 shown in FIG. 5. Upon falling of the reference pulse PI, the RS flip-flop 41 is set, turning the control signal F1 to "H". Then, the output of the logic circuit 49 becomes "L", so that the RS flip-flop 42 is reset, turning the control signal F2 to "L".

Assume that the phase switch circuit 23 determines that the operation is currently in the period TU1 in FIG. 2 based on the position signals S21, S22 and S23. As shown in FIG. 2, the period TU1 is a time period during which the U-phase current I1 is a source current having a roughly constant magnitude. Since the U-phase current I1 is the only source current in the period TU1, the phase switch circuit 23 puts the drive transistor 1 in the continuous ON state. The V-phase and W-phase currents I2 and I3 are sink currents and the magnitudes thereof must be changed. Therefore, the phase switch circuit 23 repeatedly switches the drive transistors 4 and 6 according to the control signals F1 and F2. During the period TU1, the phase switch circuit 23 turns ON the drive transistor 4 when the control signal F1 becomes "H", and turns ON the drive transistor 6 when the control signal F2 becomes "H". The drive transistors 2, 3 and 5 are put in the OFF state.

When the control signals F1 and F2 become "H" and "L", respectively, the phase switch circuit 23 turns ON the drive transistor 4 (first period T1). In this state, a current flows from the drive transistor 1 toward the U-phase coil 11 as a source current. The current flowing through the U-phase coil 11 flows toward the drive transistor 4 via the V-phase coil 12 as sink currents.

In the above state where the drive transistor 4 is ON, the V-phase current I2 flowing through the V-phase coil 12 flows through the current detection resistance 7. The magnitude of the current flowing through the current detection resistance 7 is equal to that of the U-phase current I1 flowing through the U-phase coil 11. At the current detection resistance 7, generated is a voltage proportional to the magnitude of the current flowing through the current detection resistance 7, and the amplifier 27 outputs the generated voltage to the negative input terminal of the comparator 51 as the motor current detection signal MC.

Since the U-phase coil 11, the V-phase coil 12 and the W-phase coil 13 are inductive loads, the V-phase current I2 gradually increases during the period T1 after the conduction of the drive transistor 4 (see FIG. 7). This also gradually increases the motor current detection signal MC. Once the voltage of the motor current detection signal MC reaches the voltage of the signal TS1 (see FIG. 6), the comparator 51 changes the output CP to "L". This causes the RS flip-flop 41 to be reset and reverse the output thereof to "L". The control signal F1 therefore becomes "L". This causes the RS flip-flop 42 to be set and reverse the control signal F2 to "H". The operation then shifts to the second period T2.

During the period T2, the control signals F1 and F2 are "L" and "H", respectively. Therefore, the phase switch circuit 23 turns OFF the drive transistor 4 and turns ON the drive transistor 6. With the drive transistor 4 turned OFF, a regenerative current from the V-phase coil 12 flows through the diode 3D, connected between the source and drain of the drive transistor 3, and the drive transistor 1. This V-phase current I2 flowing as a regenerative current gradually decreases (see FIG. 7). During this period, only the current flowing through the W-phase coil 13 flows to the current detection resistance 7. This enables detection of the current flowing through the W-phase coil 13 without influence of the current flowing through the V-phase coil 12.

During the period T2, the drive transistors 1 and 6 are ON. Therefore, the current flowing through the W-phase coil 13 continues increasing (see FIG. 7), and thus the current flowing to the current detection resistance 7 also continues increasing. The voltage of the motor current detection signal MC therefore increases, and when it reaches the voltage of the signal TS2 output from the torque signal generation circuit 30, the comparator 52 changes the output CP2 to "L". This causes the RS flip-flop 42 to be reset, and turns the control signal P2 to "L". The operation then shifts to period T3.

During the period T3, in which both the control signals F1 and F2 are "L", the phase switch circuit 23 turns OFF the drive transistors 4 and 6.

As described above, the drive transistor 4 is ON when the control signal F1 is "H", and the drive transistor 6 is ON when the control signal F2 is "H". During the period T1 in which the control signals F1 and F2 are "H" and "L", respectively, the current flowing through the V-phase coil 12 is controlled to be a value corresponding to the signal TS1. During the period T2 in which the control signals F1 and F2 are "L" and "H", respectively, the current flowing through the W-phase coil 13 is controlled to be a value corresponding to the signal TS2.

In other words, out of the drive transistors of the two phases (V phase and W phase) repeatedly switched during the period TU1, the drive transistor 4 of the phase (V phase) for which the current should be decreased during the period TU1 is turned ON first. When the transistor 4 is turned OFF, the drive transistor 6 of the phase (W phase) for which the current should be increased is turned ON at the same time. (see FIG. 2). Alternatively, the drive transistor 6 of the W phase may be turned ON first, and the drive transistor 4 of the V phase may be turned ON simultaneously with turning OFF of the transistor 6.

During the period T3 in which both the control signals F1 and F2 are "L", only regenerative currents flow through the coils 11 to 13. The V-phase current I2 and the W-phase current I3 flowing as regenerative currents gradually decrease (see FIG. 7). Once the reference pulse PI is input into the logic control circuit 40, both the control signals F1 and F2 become "H" and "L", respectively, and the operation described above is repeated.

Figure 8:
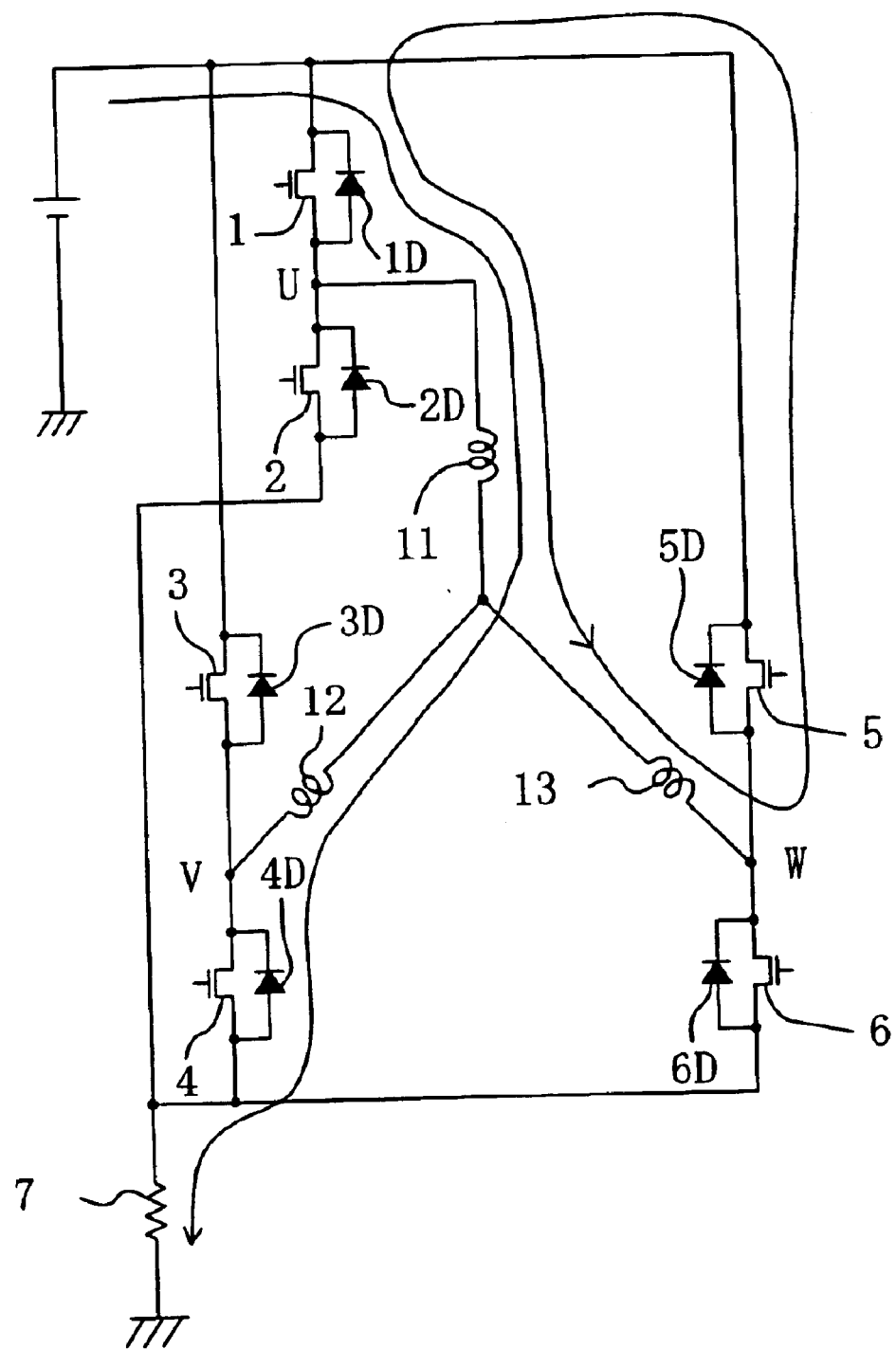
FIG. 8 is an illustration of routes of currents flowing through the motor during a period T1.

FIG. 8 is an illustration of routes of the currents flowing to the motor 10 during the period T1. Referring to FIG. 8, during the period T1, the V-phase current I2 flowing through the V-phase coil 12 follows the route from the power supply through the drive transistor 1, the U-phase coil 11, the V-phase coil 12, the drive transistor 4 and the current detection resistance 7. The W-phase current I3 flowing through the W-phase coil 13 is a regenerative current following in a loop through the drive transistor 1, the U-phase coil 11, the W-phase coil 13 and the diode 5D. Therefore, only the V-phase current I2 can be detected from the voltage generated at the current detection resistance 7.

Figure 9:
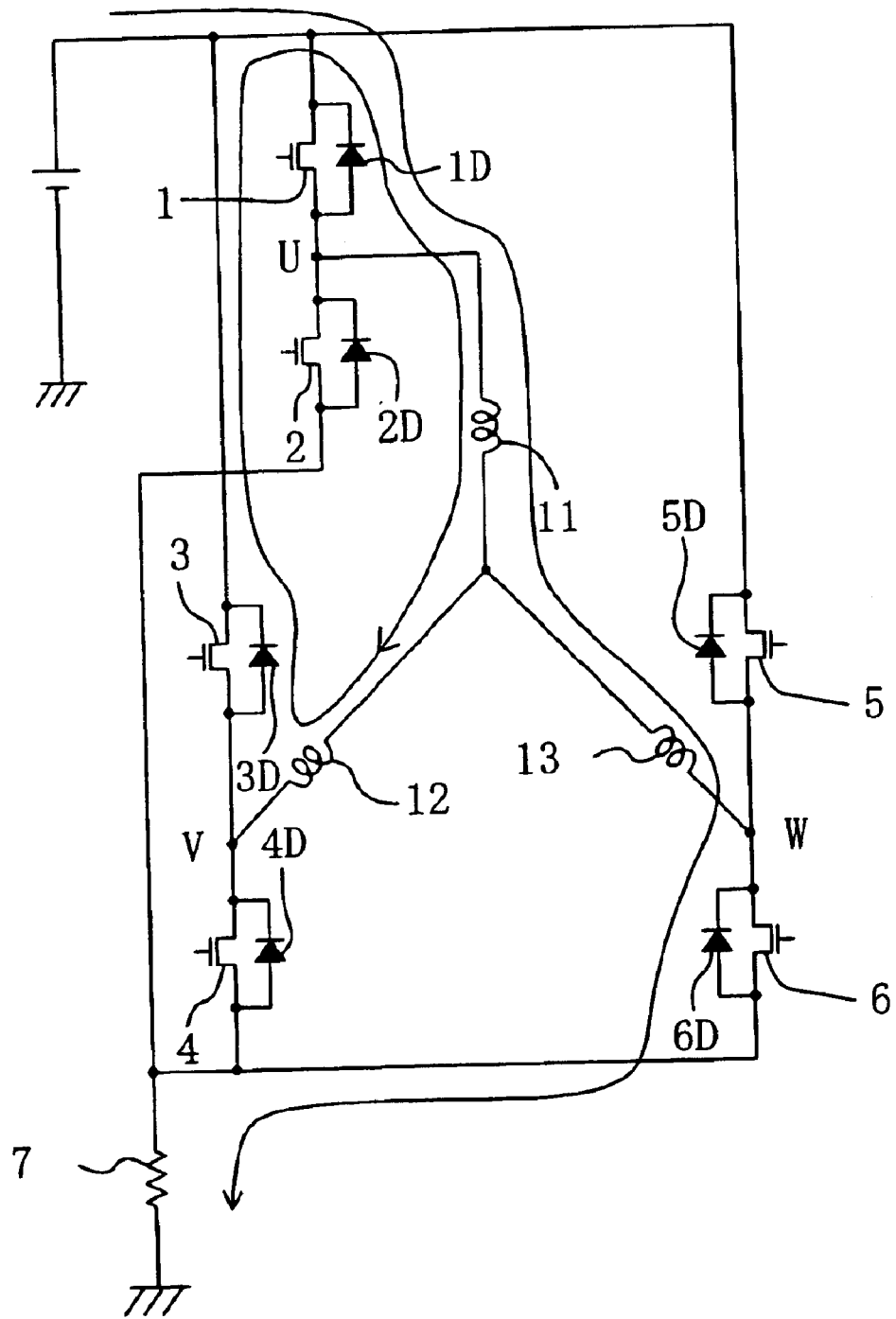
FIG. 9 is an illustration of routes of currents flowing through the motor during a period T2.

FIG. 9 is an illustration of routes of the currents flowing to the motor 10 during the period T2. Referring to FIG. 9, during the period T2, the V-phase current I2 flowing through the V-phase coil 12 is a regenerative current flowing in a loop through the drive transistor 1, the U-phase coil 11, the V-phase coil 12 and the diode 3D. The W-phase current I3 flowing through the W-phase coil 13 follows the route from the power supply through the drive transistor 1, the U-phase coil 11, the W-phase coil 13, the drive transistor 6 and the current detection resistance 7. Therefore, only the W-phase current I3 can be detected from the voltage generated at the current detection resistance 7.

Figure 10:
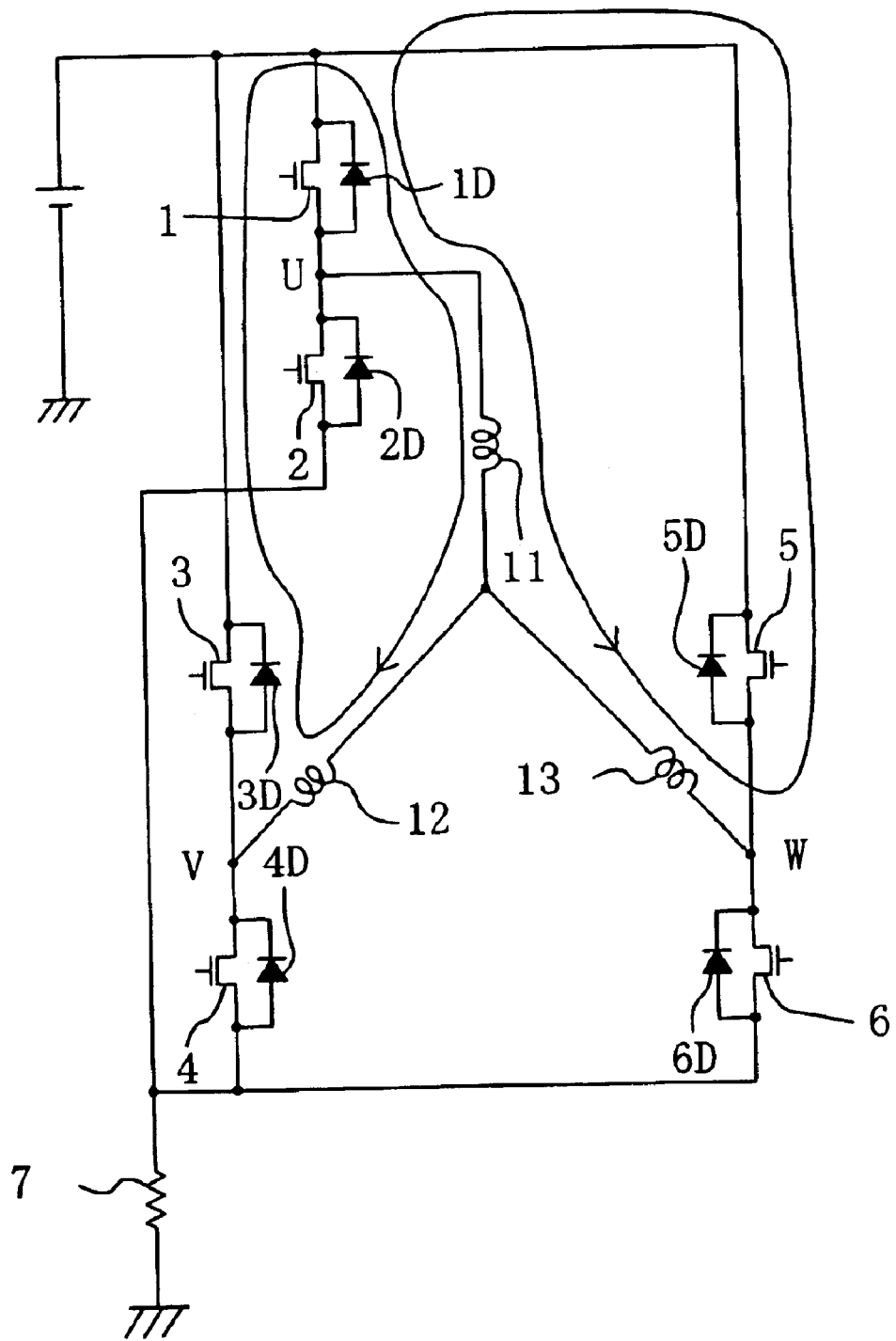
FIG. 10 is an illustration of routes of currents flowing through the motor during a period T3.

FIG. 10 is an illustration of routes of the currents flowing to the motor 10 during the period T3. Referring to FIG. 10, during the period T3, the V-phase current I2 flowing through the V-phase coil 12 is a regenerative current flowing in a loop as in FIG. 9. The W-phase current I3 flowing through the W-phase coil 13 is also a regenerative current flowing in a loop as in FIG. 8. Therefore, no current flows to the current detection resistance 7. As described above, two types of currents, that is, a drive current flowing by the conduction of a drive transistor of the output circuit for a phase, and a regenerative current flowing via a diode of the output circuit for the phase, flow alternately through the corresponding one of the coils 11 to 13.

Next, the operation of the motor driver of FIG. 1 during a period TU2 in FIG. 2 will be described. As shown in FIG. 2, the period TU2 is a period during which the U-phase current I1 is a sink current having a roughly constant magnitude. Since the U-phase current I1 is the only sink current in the period TU2, the phase switch circuit 23 puts the drive transistor 2 in the continuous ON state. The V-phase and W-phase currents I2 and I3 are source currents and the magnitudes thereof must be changed. Therefore, the phase switch circuit 23 repeatedly switches the drive transistors 3 and 5. During the period TU2, the phase switch circuit 23 turns ON the drive transistor 3 when the control signal F1 becomes "H", and turns ON the drive transistor 5 when the control signal F2 becomes "H". The drive transistors 1, 4 and 6 are put in the OFF state.

When the control signals F1 and F2 become "H" and "L", respectively, the phase switch circuit 23 turns ON the drive transistor 3 and turns OFF the drive transistor 5. When the control signals F1 and F2 are "L" and "H", respectively, the drive transistor 3 is turned OFF and the drive transistor 5 is turned ON. When both the control signals F1 and F2 are "L", both the drive transistors 3 and 5 are turned OFF.

As a result, during the period TU2, the directions of the flows of the U-phase current I1, the V-phase current I2 and the W-phase current I3 are reverse to those of the flows during the period TU1. The other aspects are substantially the same as those during the period TU1, and thus detailed description is omitted here.

The operations of the motor driver of FIG. 1 during periods TV1 and TW1 are the same as that during the period TU1, except for the following. During the period TV1 in which the V-phase current I2 is a source current having a roughly constant magnitude, the phase switch circuit 23 puts the drive transistor 3, in place of the drive transistor 1, in the continuous ON state. Also, the phase switch circuit 23 repeatedly switches the drive transistors 6 and 2, in place of the drive transistors 4 and 6, respectively, and puts the drive transistors 1, 4 and 5 in the OFF state.

During the period TW1 in which the W-phase current I3 is a source current having a roughly constant magnitude, the phase switch circuit 23 puts the drive transistor 5, in place of the drive transistor 1, in the continuous ON state. Also, the phase switch circuit 23 repeatedly switches the drive transistors 2 and 4, in place of the drive transistors 4 and 6, respectively, and puts the drive transistors 1, 3 and 6 in the OFF state.

The operations of the motor driver of FIG. 1 during periods TV2 and TW2 are the same as that during the period TU2, except for the following. During the period TV2 in which the V-phase current I2 is a sink current having a roughly constant magnitude, the phase switch circuit 23 puts the drive transistor 4, in place of the drive transistor 2, in the continuous ON state. Also, the phase switch circuit 23 repeatedly switches the drive transistors 5 and 1, in place of the drive transistors 3 and 5, respectively, and puts the drive transistors 2, 3 and 6 in the OFF state.

During the period TW2 in which the W-phase current I3 is a sink current having a roughly constant magnitude, the phase switch circuit 23 puts the drive transistor 6, in place of the drive transistor 2, in the continuous ON state. Also, the phase switch circuit 23 repeatedly switches the drive transistors 1 and 3, in place of the drive transistors 3 and 5, respectively, and puts the drive transistors 2, 4 and 5 in the OFF state.

In this embodiment, the electrical angle 360° of the motor 10 was divided into six parts and the time period corresponding to each part was used as a unit for the control. Alternatively, the electrical angle may be divided into 12 parts, for example, to switch the ON-phase every shorter time period.

There may be cases where the PWM controls of all the phases are not completed within one period of the reference pulse PI, i.e., the reference pulse PI is input before all the drive transistors for switching are turned OFF. These cases occur if the repetition frequency of the reference pulse PI is inappropriately set. Therefore, the logic control circuit 40 is preferably configured such that upon receipt of the reference pulse PI, all the drive transistors for switching are temporarily turned OFF first and then switching operation is initiated. Then, it is possible to prevent shoot-through current from flowing through drive transistors connected in series.

As described above, according to the motor driver of this embodiment, the phase currents I1 to I3 for the motor 10 can be controlled to have a roughly trapezoidal waveform having an amplitude corresponding to the torque command voltage TI as shown in FIG. 2. Therefore, the changes of the phase currents at the phase switches can be made mild.

In PWM control of three phase currents, three current detection resistances are normally required. In the motor driver of this embodiment, however, the three phase currents can be controlled with only one current detection resistance, and thus PWM control without a variation in magnitude of the phase currents is possible. In addition, with the reduced number of current detection resistances, the scale of the device can be reduced.

Embodiment 2

Figure 11:
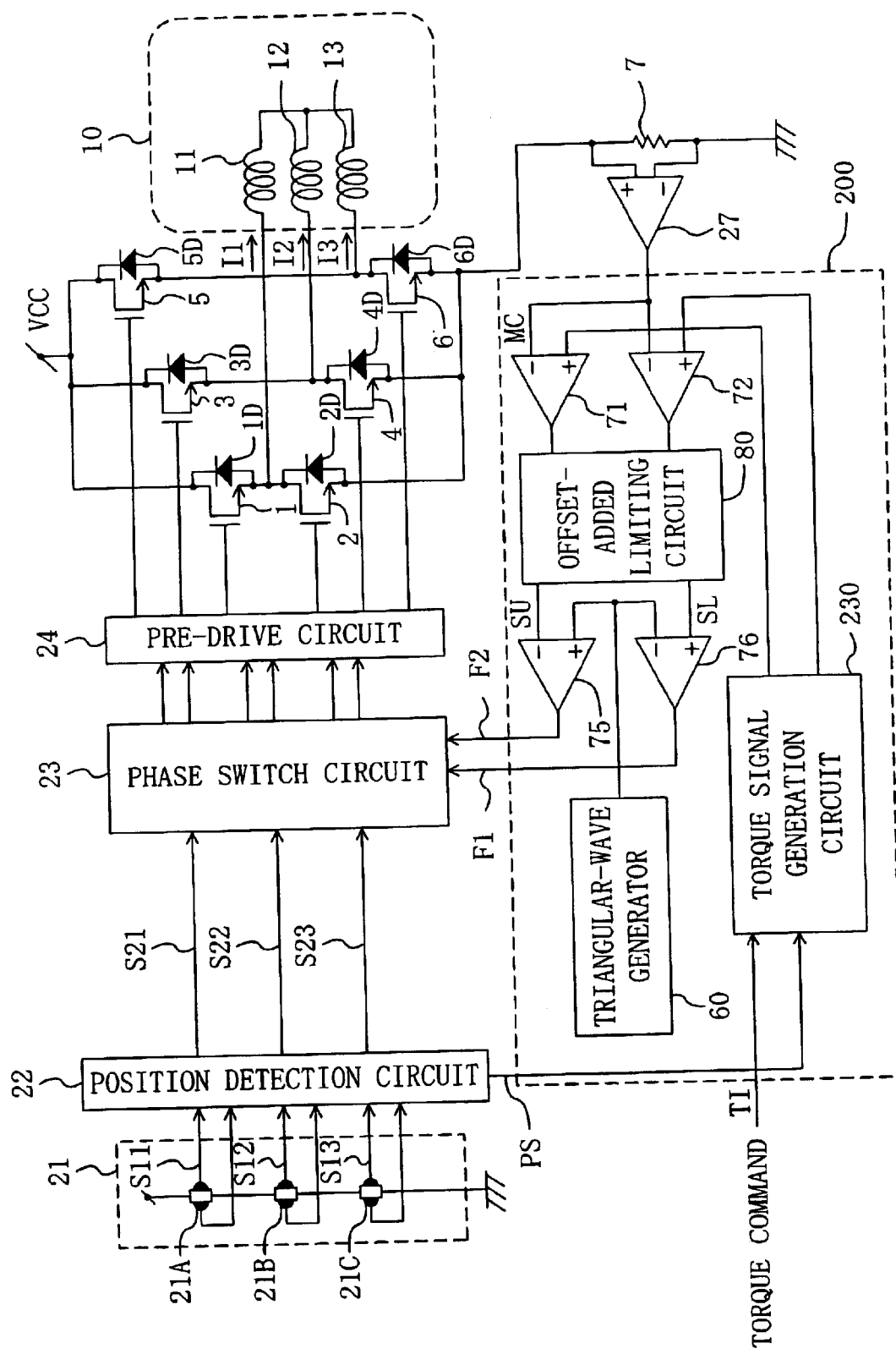
FIG. 11 is a block diagram of a motor driver according to a second embodiment of the present invention.

FIG. 11 is a block diagram of a motor driver according to a second embodiment of the present invention. The motor driver of FIG. 11 is a driver in which the ON-period control section 100 of the motor driver shown in FIG. 1 is replaced with an ON-period control section 200. The other components of the motor driver of this embodiment are the same as those described with reference to FIG. 1. Therefore, these components are denoted by the same reference numerals and the description thereof is omitted here.

The ON-period control section 200 includes a torque signal generation circuit 230, a triangular-wave generator 60, error amplifiers 71 and 72, comparators 75 and 76 and an offset-added limiting circuit 80.

Figure 12:
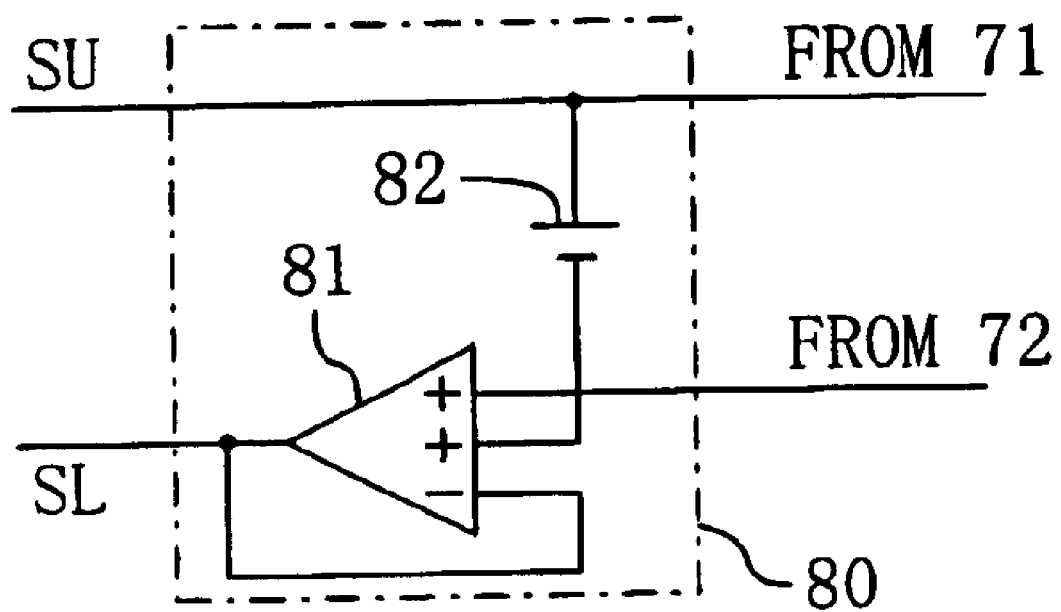
FIG. 12 is a circuit diagram of an example of an offset-added limiting circuit.

FIG. 12 is a circuit diagram showing an example of a configuration of the offset added limiting circuit 80. The offset-added limiting circuit 80 includes an operation amplifier 81 and an offset-setting voltage source 82. The offset-setting voltage source 82 is connected between an input terminal of the offset-added limiting circuit 80 and a positive input terminal of the operation amplifier 81. Another positive input terminal of the operation amplifier 81 serves as another input terminal of the offset-added limiting circuit 80. One of the input signals input to the offset-added limiting circuit 80 is output as a slice level signal SU without change. The operation amplifier 81 outputs a slice level signal SL.

Figure 13:
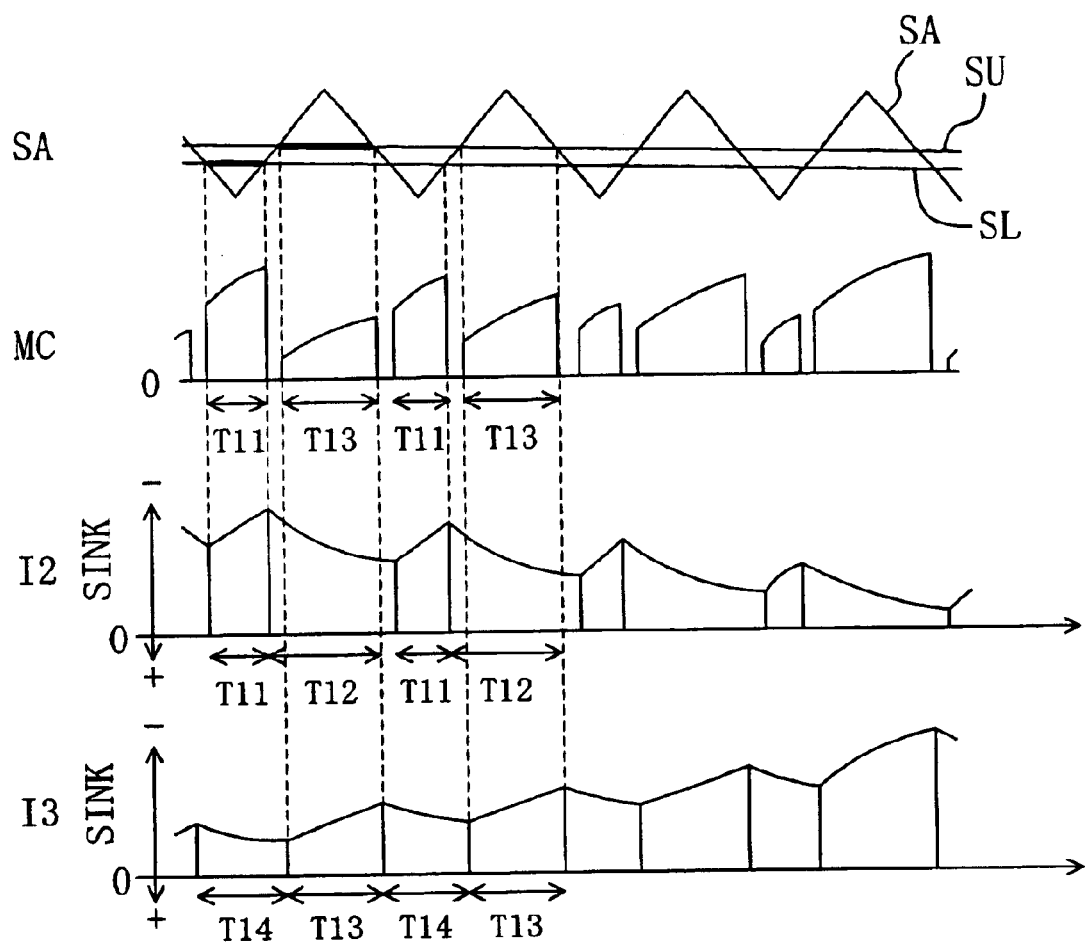
FIG. 13 is a graph showing phase currents and a signal for an ON-period control section in the motor driver in FIG. 11.

FIG. 13 is a graph showing phase currents and a signal for the ON-period control section 200 in the motor driver of FIG. 11. FIG. 13 shows areas at and around time t=t1 in FIGS. 2 and 4 in an enlarged manner. The operation of the ON-period control section 200 and the current flowing in the motor 10 will be described with reference to FIGS. 11 and 13.

As the torque signal generation circuit 30, the torque signal generation circuit 230 generates torque signals for two phases according to a torque command voltage and outputs the torque signals to the error amplifiers 71 and 72, respectively. The error amplifiers 71 and 72 have a function of sampling and holding a signal output from the amplifier 27, e.g., the value of the output from the amplifier 27 immediately before the end of a period in which a current flows to the current detection resistance 7. Each of the error amplifiers 71 and 72 amplifies the difference between the torque signals for respective phases input thereto and the output of the amplifier 27, and outputs the resultant signal to the offset-added limiting circuit 80.

The offset-added limiting circuit 80 outputs the first and second slice level signals SU and SL to the comparators 75 and 76, respectively, according to the outputs of the error amplifiers 71 and 72. The slice level signal SU is a signal which decreases as the torque command voltage T1 increases, whereas the slice level signal SL is a signal which increases as the torque command voltage T1 increases.

The triangular-wave generator 60 generates a triangular wave SA having a roughly constant period as shown in FIG. 13 and outputs the triangular wave SA to the comparators 75 and 76. The comparator 75 outputs, as a switching control signal F2, "H" if the triangular wave SA is higher than the slice level signal SU, and otherwise "L", to a phase switch circuit 23. The comparator 76 outputs, as a switching control signal F1, "H" if the slice level signal SL is higher than the triangular wave SA, and otherwise "L", to a phase switch circuit 23.

The offset-added limiting circuit 80 limits the levels of the slice level signals SU and SL with an offset provided therebetween such that the slice level signal SU is always higher than the slice level signal SL, and outputs the slice level signals SU and SL. Therefore, the periods in which the control signal F2 output from the comparator 75 is "H" and the periods in which the control signal F1 output from the comparator 76 is "H" can be made not to overlap with each other. Accordingly, as in the first embodiment, a plurality of phase currents are not flown to the current detection resistance 7 at the same time.

In this manner, in the motor driver of this embodiment, the changes of the phase currents at the phase switches can be made mild, and in addition, three phase currents can be controlled with only one current detection resistance.

Embodiment 3

In the foregoing embodiments, the drive of the 3-phase motor with phase currents having trapezoidal waveforms was described. However, the phase currents do not necessarily have trapezoidal waveforms and may be sine waves or may have other waveforms. The present invention is not limited to the drive of the 3-phase motor and is applicable to the drive of a motor of an even number of phases that is four or more. Hereinafter, the case where phase currents have waveforms other than trapezoidal waveforms will be described. In this embodiment, a modified form of the motor driver shown in FIG. 1 is used.

Figure 14:
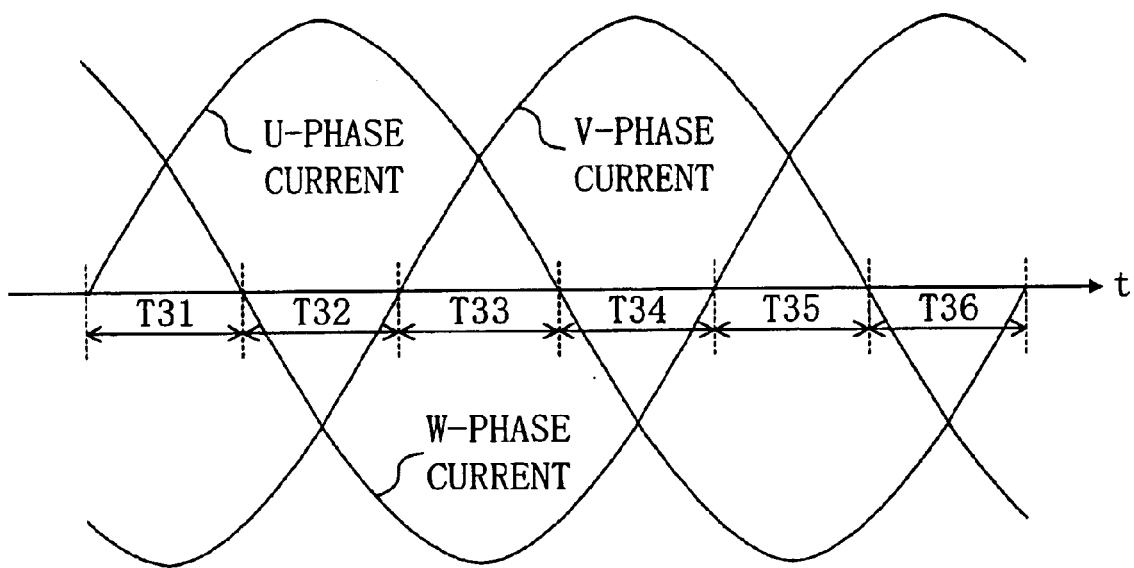
FIG. 14 is a graph showing waveforms of output currents of respective phases in driving a 3-phase motor such that the phase currents are sine waves.

FIG. 14 is a graph showing waveforms of output currents of respective phases in driving a 3-phase motor such that the phase currents are sine waves. In order to achieve such operation as shown in FIG. 14, it is sufficient for the output of the torque generation circuit 30 in FIG. 1 to have the shape of a sine wave instead of the shape of a sawtooth wave as shown in FIG. 4. Specifically, it is sufficient to use a signal with repetition of waveforms in the range from 0° to 60° of the phase of a sine wave as a signal TS2, and a signal with repetition of waveforms in the range from 120° to 180° of the phase of a sine wave as a signal TS1.

In this case, the magnitude of the W-phase current, for example, is equal to the sum of the other two phase currents (the U-phase current and the V-phase current) which are shifted from the W-phase current by 120°, and the direction of the W-phase current is opposite to the direction of the other two phase currents.

Figure 15:
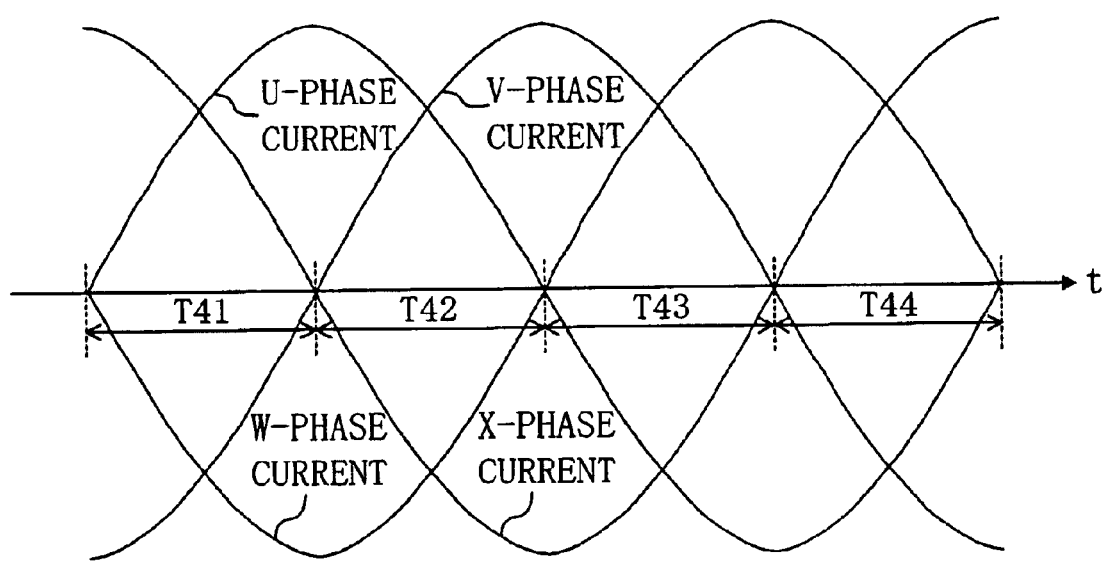
FIG. 15 is a graph showing waveforms of output currents of respective phases in driving a 4-phase motor such that the phase currents are sine waves.

FIG. 15 is a graph showing waveforms of output currents of respective phases in driving a 4-phase motor such that the phase currents are sine waves. Although not shown specifically, in the case of the 4-phase drive, it is assumed that the drive transistors and coils for the respective phases in the motor are connected in the following manner.

Specifically, as in the circuit configured by the drive transistors 1 and 2 and the diodes 1D and 2D shown in FIG. 1, the motor driver includes four circuits (half-bridge circuits) in each of which an upper side drive transistor and a lower side drive transistor are connected in series and diodes are connected to the drain and source of each of the transistors. These four half-bridges correspond to the respective phases and are connected in parallel. One terminal of each of the half-bridges is connected to a power supply VCC in common, and the other is connected to a terminal of a current detection resistance in common. The other terminal of the current detection resistance is grounded. The connection point between the upper side drive transistor and the lower side drive transistor in each of the half-bridges is connected to one terminal of one of the coils for the corresponding phase. The other terminals of the respective coils are connected to each other.

In order to achieve such operation of phase currents as shown in FIG. 15, it is sufficient for the output of the torque generation circuit 30 in FIG. 1 to have the shape of a sine wave instead of the shape of a sawtooth wave as shown in FIG. 4. Specifically, it is sufficient to use a signal with repetition of waveforms in the range from 0° to 90° of the phase of a sine wave as a signal TS2, and a signal with repetition of waveforms in the range from 90° to 180° of the phase of a sine wave as a signal TS1.

In driving a motor of an even number of phases, with respect to two phases exhibiting different directions of currents and having substantially the same magnitude (i.e., two phases opposite to each other), it is sufficient to drive an upper side drive transistor for one phase and a lower side drive transistor for the other phase as a pair at the same time. Therefore, control is performed in the same manner as in the case of driving a motor of substantially a half number of phases. That is to say, the 4-phase motor can be operated by the 2-phase sine-wave drive using sine waves of which phases differ from each other by 90° as target values of respective phase currents.

During a period T41 in FIG. 15, as the periods T1 and T2 in FIG. 6, time periods in which a U-phase upper side drive transistor and a W-phase lower side drive transistor are turned ON at the same time and time periods in which a V-phase lower side drive transistor and an X-phase upper side drive transistor are turned ON at the same time are alternately provided.

During the time periods in which the U-phase upper side drive transistor and the W-phase lower side drive transistor are turned ON, currents passing through these drive transistors, a U-phase coil and a W-phase coil flow to the current detection resistance. At this time, the V-phase current and the X-phase current flow as a regenerative current. Since only the U-phase current (W-phase current) flows to the current detection resistance, the U-phase current can be detected, so that feedback control can be performed such that the U-phase and W-phase currents have target values respectively.

During the time periods in which the V-phase lower side drive transistor and the X-phase upper side drive transistor are turned ON, currents passing through these drive transistors, a V-phase coil and an X-phase coil flow to the current detection resistance. At this time, the U-phase current and the W-phase current flow as a regenerative current. Since only the V-phase current (X-phase current) flows to the current detection resistance, the V-phase current can be detected, so that feedback control can be performed such that the V-phase and X-phase currents have target values respectively. In this way, the time periods in which phase currents to be detected flow to the current detection resistance are made not to overlap with the time periods in which the other phase currents flow to the current detection resistance.

In the same manner, during a period T42, time periods in which the U-phase upper side drive transistor and the W-phase lower side drive transistor are turned ON at the same time and time periods in which a V-phase upper side drive transistor and an X-phase lower side drive transistor are turned ON at the same time are provided. During a period T43, time periods in which a U-phase lower side drive transistor and a W-phase upper side drive transistor are turned ON at the same time and time periods in which the V-phase upper side drive transistor and the X-phase lower side drive transistor are turned ON at the same time are provided. During a period T44, time periods in which the U-phase lower side drive transistor and the W-phase upper side drive transistor are turned ON at the same time and time periods in which the V-phase lower side drive transistor and the X-phase upper side drive transistor are turned ON at the same time are provided. As a result, the 4-phase motor can be driven such that the phase currents are sine waves.

Figure 16:
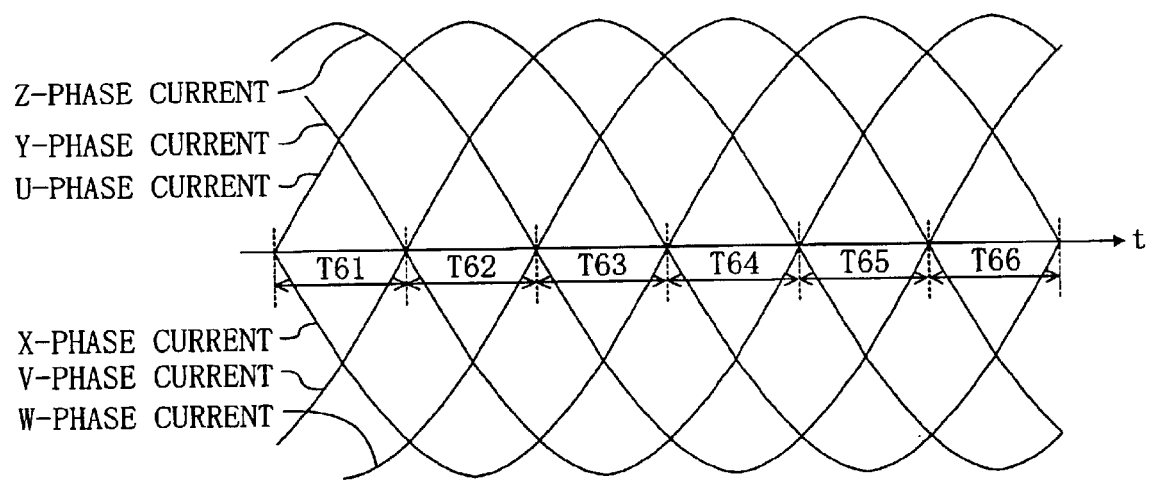
FIG. 16 is a graph showing waveforms of output currents of respective phases in driving a 6-phase motor such that the phase currents are sine waves.

FIG. 16 is a graph showing waveforms of output currents of respective phases in driving a 6-phase motor such that the phase currents are sine waves. Although not shown specifically, in the case of the 6-phase drive, the drive transistors and coils for the respective phases in the motor are connected in the following manner.

Specifically, the motor driver includes six half-bridges. These six half-bridges correspond to the respective phases and are connected in parallel. One terminal of each of the half-bridges is connected to a power supply VCC in common, and the other is connected to one terminal of a current detection resistance in common. The other terninal of the current detection resistance is grounded. The connection point between the upper side drive transistor and the lower side drive transistor in each of the half-bridges is connected to one terminal of one of the coils for the corresponding phase. The other terminals of the respective coils are connected to each other.

In order to achieve such operation of phase currents as shown in FIG. 16, it is sufficient for the output of the torque generation circuit 30 in FIG. 1 to have the shape of a sine wave instead of the shape of a sawtooth wave as shown in FIG. 4. Specifically, it is sufficient to use a signal with repetition of waveforms in the range from 0° to 60°, 60° to 120° or 120° to 180° of the phase of a sine wave.

In driving the 6-phase motor, which is of an even number of phases as in the case of the 4-phase motor, with respect to two phases exhibiting different directions of currents and having substantially the same magnitude, it is sufficient to drive an upper side drive transistor for one phase and a lower side drive transistor for the other phase as a pair at the same time. Therefore, control is performed in the same manner as in the case of driving a motor of substantially a half number of phases. That is to say, the 6-phase motor can be operated by the 3-phase sine-wave drive using sine waves of which phases differ from each other by 60° as target values of respective phase currents.

During a period T61 in FIG. 16, time periods in which a U-phase upper side drive transistor and an X-phase lower side drive transistor are turned ON at the same time, time periods in which a V-phase lower side drive transistor and a Y-phase upper side drive transistor are turned ON at the same time, and time periods in which a W-phase lower side drive transistor and a Z-phase upper side drive transistor are turned ON at the same time are provided in order.

During the time periods in which the U-phase upper side drive transistor and the X-phase lower side drive transistor are turned ON, currents passing through these drive transistors, a U-phase coil and an X-phase coil flow to the current detection resistance. At this time, the currents other than the U-phase and X-phase currents flow as a regenerative current. Since only the U-phase current (X-phase current) flows to the current detection resistance, the U-phase current can be detected, so that feedback control can be performed such that the U-phase and X-phase currents have target values respectively.

During the time periods in which the V-phase lower side drive transistor and the Y-phase upper side drive transistor are turned ON, currents passing through these drive transistors, a V-phase coil and a Y-phase coil flow to the current detection resistance. At this time, the currents other than the V-phase and Y-phase current flow as a regenerative current. Since only the V-phase current (Y-phase current) flows to the current detection resistance, the V-phase current can be detected, so that feedback control can be performed such that the V-phase and Y-phase currents have target values respectively.

Likewise, during the time periods in which the W-phase lower side drive transistor and the Z-phase upper side drive transistor are turned ON, feedback control can be performed such that the W-phase and Z-phase currents have target values respectively. In this manner, the time periods in which phase currents to be detected flow to the current detection resistance are made not to overlap with the time periods in which the other phase currents flow to the current detection resistance.

In the same manner, during a period T62, time periods in which the U-phase upper side drive transistor and the X-phase lower side drive transistor are turned ON at the same time, time periods in which a V-phase upper side drive transistor and a Y-phase lower side drive transistor are turned ON at the same time, and time periods in which the W-phase lower side drive transistor and the Z-phase upper side drive transistor are turned ON at the same time are provided in order.

During a period T63, time periods in which the U-phase upper side drive transistor and the X-phase lower side drive transistor are turned ON at the same time, time periods in which the V-phase upper side drive transistor and the Y-phase lower side drive transistor are turned ON at the same time, and time periods in which a W-phase upper side drive transistor and a Z-phase lower side drive transistor are turned ON at the same time are provided in order. Subsequently, during periods T64 through T66, transistors to be turned ON are sequentially switched in the same manner. As a result, the 6-phase motor can be driven such that the phase currents are sine waves.

In driving the 6-phase motor, transistors to be turned ON may be switched in the following manner. That is to say, during the period T62 shown in FIG. 16, the U-phase upper side drive transistor and the X-phase lower side drive transistor are turned ON at the same time. In this period, time periods in which the W-phase lower side drive transistor and the Z-phase upper side drive transistor are turned ON at the same time, and time periods in which the Y-phase lower side drive transistor and the V-phase upper side drive transistor are turned ON at the same time are alternately provided.

During the period T63, the V-phase upper side drive transistor and the Y-phase lower side drive transistor are turned ON at the same time. In this period, time periods in which the X-phase lower side drive transistor and the U-phase upper side drive transistor are turned ON at the same time, and time periods in which the Z-phase lower side drive transistor and the W-phase upper side drive transistor are turned ON at the same time are alternately provided.

In the same manner, during the period T64, the W-phase upper side drive transistor and the Z-phase lower side drive transistor are turned ON at the same time. In this period, time periods in which the Y-phase lower side drive transistor and the V-phase upper side drive transistor are turned ON at the same time, and time periods in which the U-phase lower side drive transistor and the X-phase upper side drive transistor are turned ON at the same time are alternately provided. Subsequently, during the periods T65 and T66, transistors to be turned ON are sequentially switched in the same manner.

Figure 17:
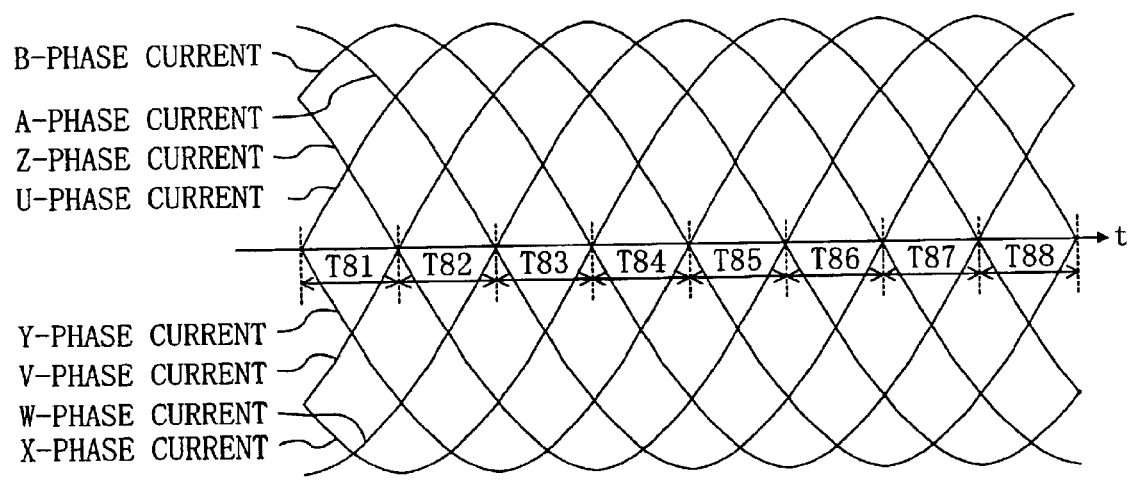
FIG. 17 is a graph showing waveforms of output currents of respective phases in driving an 8-phase motor such that the phase currents are sine waves.
Figure 18:
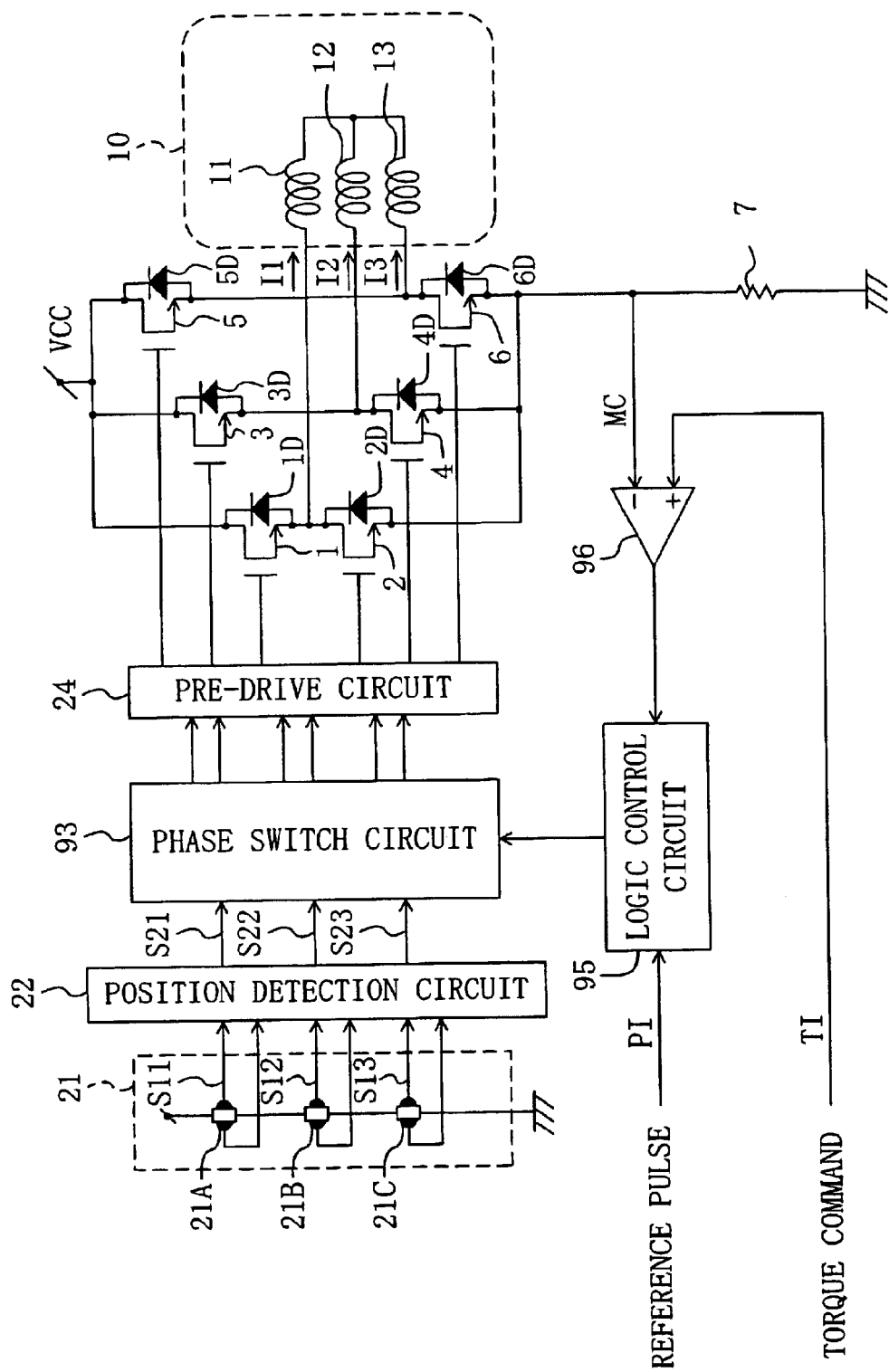
FIG. 18 is a block diagram of a conventional motor driver of the peak current detecting method.
Figure 19:
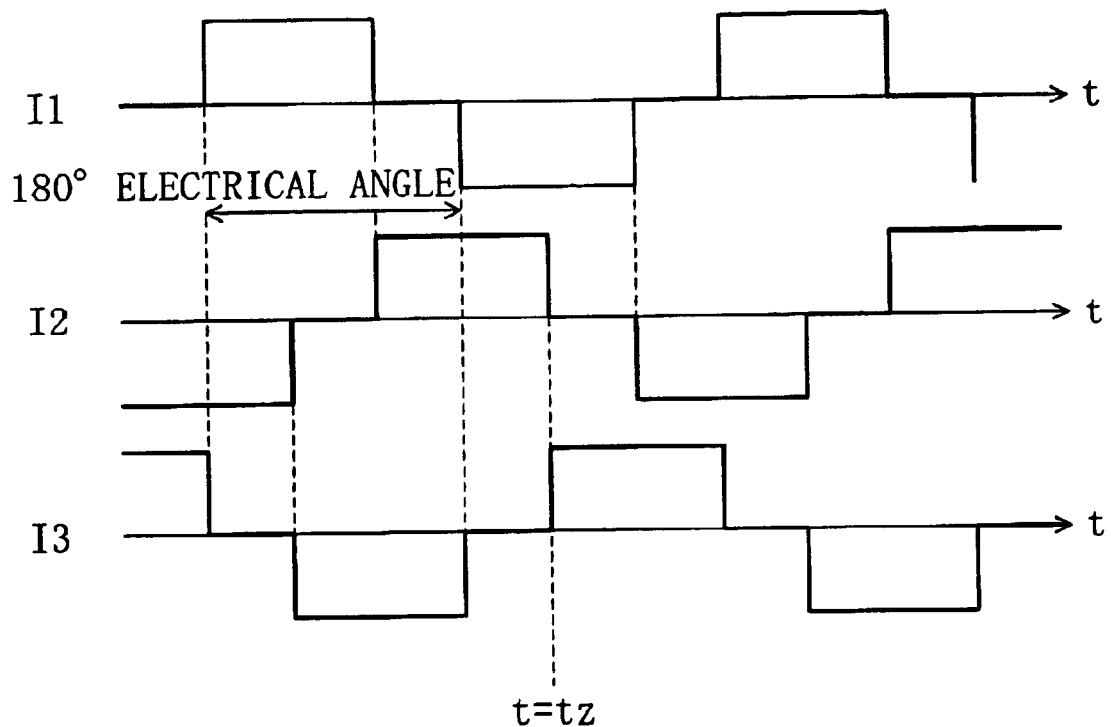
FIG. 19 is a graph showing changes with time of phase currents for a motor driven by the motor driver of FIG. 18.
Figure 20:
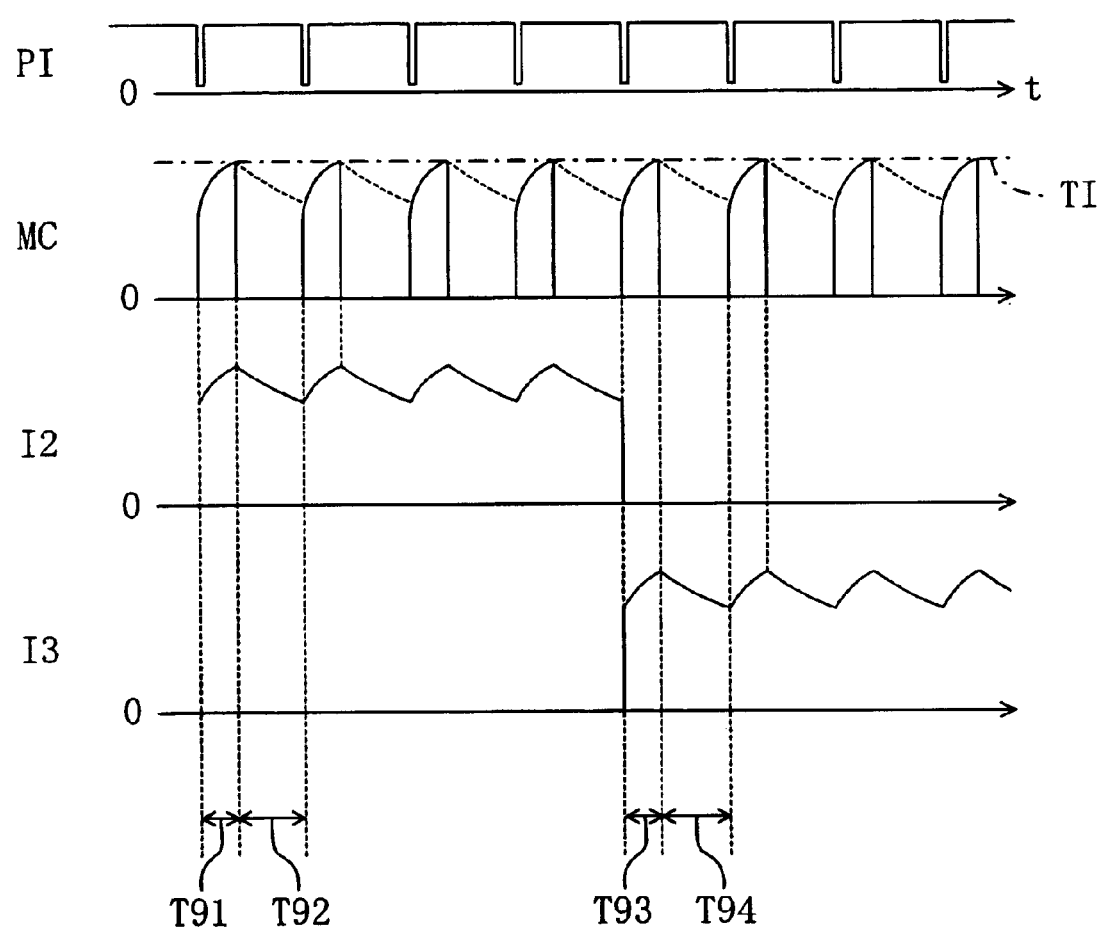
FIG. 20 is a graph showing a current detection resistance voltage (motor current detection signal) and V-phase and W-phase currents at and around time t=tz in FIG. 19, obtained by enlarging the time axis.

FIG. 17 is a graph showing waveforms of output currents of respective phases in driving an 8-phase motor such that the phase currents are sine waves. Although not shown specifically, in the case of the 8-phase drive, it is assumed that the drive transistors and coils for the respective phases in the motor are connected in the following manner.

Specifically, the motor driver includes eight half-bridges. These eight half-bridges correspond to the respective phases and are connected in parallel. One terminal of each of the half-bridges is connected to a power supply VCC in common, and the other is connected to one terminal of a current detection resistance in common. The other terminal of the current detection resistance is grounded. The connection point between the upper side drive transistor and the lower side drive transistor in each of the half-bridges is connected to one terminal of one of the coils for the corresponding phase. The other terminals of the respective coils are connected to each other.

In order to achieve such operation of phase currents as shown in FIG. 17, it is sufficient for the output of the torque generation circuit 30 in FIG. 1 to have the shape of a sine wave instead of the shape of a sawtooth wave as shown in FIG. 4. Specifically, it is sufficient to use a signal with repetition of waveforms in the range from 0° to 45°, 45° to 90°, 90° to 135° or 135° to 180° of the phase of a sine wave.

In driving the 8-phase motor, which is of an even number of phases as in the case of the 4-phase motor, with respect to two phases exhibiting different directions of currents and having substantially the same magnitude, it is sufficient to drive an upper side drive transistor for one phase and a lower side drive transistor for the other phase as a pair at the same time. Therefore, control is performed in the same manner as in the case of driving a motor of substantially a half number of phases. That is to say, the 8-phase motor can be operated by the 4-phase sine-wave drive using sine waves of which phases differ from each other by 45° as target values of respective phase currents.

During a period T81 in FIG. 17, time periods in which a U-phase upper side drive transistor and a Y-phase lower side drive transistor are turned ON at the same time, time periods in which a V-phase lower side drive transistor and a Z-phase upper side drive transistor are turned ON at the same time, time periods in which a W-phase lower side drive transistor and an A-phase upper side drive transistor are turned ON at the same time, and time periods in which an X-phase lower side drive transistor and a B-phase upper side drive transistor are turned ON at the same time are provided in order.

During the time periods in which the U-phase upper side drive transistor and the Y-phase lower side drive transistor are turned ON, currents passing through these drive transistors, a U-phase coil and a Y-phase coil flow to the current detection resistance. At this time, the currents other than the U-phase and Y-phase currents flow as a regenerative current. Since only the U-phase current (Y-phase current) flows to the current detection resistance, the U-phase current can be detected, so that feedback control can be performed such that the U-phase and Y-phase currents have target values respectively.

During the time periods in which the V-phase lower side drive transistor and the Z-phase upper side drive transistor are turned ON, currents passing through these drive transistors, a V-phase coil and an Z-phase coil flow to the current detection resistance. At this time, the currents other than the V-phase and Z-phase currents flow as a regenerative current. Since only the V-phase current (Z-phase current) flows to the current detection resistance, the V-phase current can be detected, so that feedback control can be performed such that the V-phase and Z-phase currents have target values respectively.

Likewise, during the time periods in which the W-phase lower side drive transistor and the A-phase upper side drive transistor are turned ON at the same time, feedback control can be performed such that the W-phase and A-phase currents have target values respectively. During the time periods in which the X-phase lower side drive transistor and the B-phase upper side drive transistor are turned ON at the same time, feedback control can be performed such that the X-phase and B-phase currents have target values respectively. In this manner, the time periods in which phase currents to be detected flow to the current detection resistance are made not to overlap with the time periods in which the other phase currents flow to the current detection resistance.

In the same manner, during a period T82, time periods in which the U-phase upper side drive transistor and the Y-phase lower side drive transistor are turned ON at the same time, time periods in which a V-phase upper side drive transistor and a Z-phase lower side drive transistor are turned ON at the same time, the W-phase lower side drive transistor and the A-phase upper side drive transistor are turned ON at the same time, and time periods in which an X-phase lower side drive transistor and a B-phase upper side drive transistor are turned ON at the same time are provided in order. Subsequently, during periods T83 through T88, transistors to be turned ON are sequentially switched in the same manner. As a result, the 8-phase motor can be driven such that the phase currents are sine waves.

The case of a motor of an even number of phases that is ten or more can be described in the same manner.

In the third embodiment, a peak current control as described in the first embodiment may be performed, or a PWM control with triangular-wave slicing as described in the second embodiment may be performed.

In the embodiments described above, the motor driver includes the diodes 1D to 6D. Alternatively, each of the drive transistors 1 to 6 may include a parasitic diode. In other words, a diode may structurally exist in each of the drive transistors 1 to 6.

Transistors other than the n-type MOS transistors may be used as the drive transistors 1 to 6.

In the above embodiments, the current detection resistance 7 was provided between the sources of the lower side transistors 2, 4 and 6 and the ground. Alternatively, the current detection resistance may be provided between the power supply VCC and the drains of the upper side transistors 1, 3 and 5.

The Y connection was adopted for the motor in the above embodiments. Alternatively, delta connection may be adopted.

The order of the three phases of the phase currents from ahead to behind was the U phase, the V phase and the W phase. The present invention is also applicable to the case of adopting the order of the W phase, the V phase and the U phase to reverse the rotation of the motor.

The Hall sensors were used for position detection in the above description. However, use of Hall sensors is not necessarily a requisite. For example, a CR filter circuit may be provided for each of the U, V and W phases, to filter a harmonic content of a PWM drive current. The output of the filter and a reference voltage (i.e., a potential at a connection point of three Y-connected coils) of the motor may be compared for each phase, to detect the position of a rotor of the motor. However, in consideration of malfunction that may occur due to the harmonic content of the PWM drive current, use of Hall sensors is more advantageous.

In addition, synchronous rectification operation can be performed under synchronous operation by inverting the phase of a transistor other than a transistor in the ON state between each pair of drive transistors connected in series constituting a half-bridge.

Further, the motor may be driven without using any sensor. That is to say, a drive transistor of a phase is turned OFF at and around a zero-cross point at which the direction of a phase current for the phase is switched, and a mask period in which the phase current is zero is provided to detect a counter electromotive force within the period, thereby obtaining a signal about a rotor position. Application of a torque command signal for setting the phase current at zero before and after the mask period prevents the phase current from changing sharply in a shift to the mask period, and thus vibration of the motor and electromagnetic noise during the phase switch can be reduced also in the sensorless motor.

In the above embodiments, one detection resistance was provided. Alternatively, two or more detection resistances may be provided if a plurality of phases are used. That is to say, in the case of eight phases, for example, two detection resistances may be provided so that drive transistors for four phases are connected to one of the detection resistances in common and the drive transistors for the other phases are connected to the other detection resistance in common. Then, the motor is relieved from the restriction that a phase utilizing one of the detection resistances must utilize the regenerative period of a phase utilizing the other detection resistance, so that the maximum duty of the PWM control can be increased.

Thus, according to the motor driver of the present invention, the phase currents are prevented from sharp change, and thus vibration of the motor and generation of noise during phase switch can be suppressed. Since the number of current detection resistances to be used is smaller than the number of phases, the scale of the device can be reduced.

What is claimed is:

1. A motor drive method for a motor driver having a plurality of output circuits each including an upper side switching element and a lower side switching element connected in series, and a current detection resistance connected in series with the plurality of output circuits in common for detecting a current supplied to the plurality of output circuits, the motor driver supplying a current to a motor from a connection point between the upper side switching element and the lower side switching element of each of the output circuits, the motor drive method comprising the steps of:

determining a position signal corresponding to the position of a rotor of the motor;

selecting one switching element of one of the plurality of output circuits according to the position, signal and turning ON the selected switching element for a time period corresponding to a predetermined electrical angle; and repeatedly switching lower side switching elements of a plurality of output circuits among the remaining ones of the plurality of output circuits when the selected switching element is an upper side switching element, while repeatedly switching upper side switching elements of a plurality of output circuits among the remaining ones of the plurality of output circuits when the selected switching element is a lower side switching element, wherein in the switching step, the switching operation is controlled according to an input torque command signal and a voltage generated at the current detection resistance so that each of a plurality of periods obtained by dividing the time period corresponding to the predetermined electrical angle includes a first period in which one of the switching elements to be switched is turned ON and a second period in which another one of the switching elements is turned ON.

2. The method of claim 1, wherein in the switching step, the first period is started when a reference pulse is input, and is terminated when the voltage generated at the current detection resistance reaches a target signal.

3. The method of claim 2, wherein in the switching step, upon receipt of the reference pulse, all the switching elements to be switched are turned OFF and then the first period is started.

4. A motor drive method for a motor driver having an even number of output circuits that is four or more each including an upper side switching element and a lower side switching element connected in series, and a current detection resistance connected in series with the output circuits in common for detecting a current supplied to the output circuits, the motor driver supplying a current to a motor from a connection point between the upper side switching element and the lower side switching element of each of the output circuits, the motor drive method comprising the steps of:

determining a position signal corresponding to the position of a rotor of the motor;

selecting one switching element of one of the output circuits according to the position signal, and, for a time period corresponding to a predetermined electrical angle, turning ON a pair of the selected switching element and a lower side switching element of the output circuit corresponding to a phase opposite to a phase corresponding to the output circuit including the selected switching element when the selected switching element is an upper side switching element, while turning ON a pair of the selected switching element and an upper side switching element of the output circuit corresponding to a phase opposite to a phase corresponding to the output circuit including the selected switching element when the selected switching element is a lower side switching element; and repeatedly switching each pair of any one of the lower side switching elements of a plurality of output circuits among the remaining ones of the output circuits and the upper side switching element corresponding to a phase opposite to a phase corresponding to the output circuit including said one lower side switching element when the selected switching element is an upper side switching element, while repeatedly switching each pair of any one of the upper side switching elements of a plurality of output circuits among the remaining ones of the output circuits and the lower side switching element corresponding to a phase opposite to a phase corresponding to the output circuit including said one upper side switching element when the selected switching element is a lower side switching element, wherein in the switching step, the switching operation is controlled according to an input torque command signal and a voltage generated at the current detection resistance so that each of a plurality of periods obtained by dividing the time period corresponding to the predetermined electrical angle includes a first period in which one pair of the switching elements are turned ON and a second period in which another pair of the switching elements are turned ON.

5. The method of claim 4, wherein in the switching step, the first period is started when a reference pulse is input, and is terminated when the voltage generated at the current detection resistance reaches a target signal.

6. The method of claim 5, wherein in the switching step, upon receipt of the reference pulse, all the switching elements to be switched are turned OFF and then the first period is started.

7. A motor drive method for a motor driver having a plurality of output circuits each including an upper side switching element and a lower side switching element connected in series, and a current detection resistance connected in series with the plurality of output circuits in common for detecting a current supplied to the plurality of output circuits, the motor driver supplying currents to motor coils of a plurality of phases from a connection point between the upper side switching element and the lower side switching element of each of the output circuits, wherein a period in which respective phase currents for the motor coils of the plurality of phases flow simultaneously is divided into pulse width modulation (PWM) control periods, and in each of the PWM control periods, a PWM control is performed by providing said each of the PWM control periods with a period in which the switching elements are selectively turned ON until a signal corresponding to the value of a current flowing each of the switching elements coincides with a signal obtained from the current detection resistance such that a current flowing through the current detection resistance is the same as a current passing through specific one of the upper and lower switching elements, and a period in which phase currents for phases other than a phase relating to the specific switching element are made in regenerative states.

8. A motor driver having a plurality of output circuits each including an upper side switching element and a lower side switching element connected in series, for supplying a current to a motor from a connection point between the upper side switching element and the lower side switching element of each output circuit, the motor driver comprising:

a current detection resistance connected in series with the plurality of output circuits in common for detecting a current supplied to the plurality of output circuits;

a position detection section for outputting a position signal corresponding to the position of a rotor of the motor;

a phase switch circuit for selecting one switching element of one of the plurality of output circuits according to the position signal and turning ON the selected switching element for a time period corresponding to a predetermined electrical angle, and repeatedly switching lower side switching elements of a plurality of output circuits among the remaining ones of the plurality of output circuits when the selected switching element is an upper side switching element, while repeatedly switching upper side switching elements of a plurality of output circuits among the remaining ones of the plurality of output circuits when the selected switching element is a lower side switching element; and an ON-period control section for generating a switching control signal for controlling the switching operation by the phase switch circuit according to an input torque command signal and a voltage generated at the current detection resistance so that each of a plurality of periods obtained by dividing the time period corresponding to the predetermined electrical angle includes a first period in which one of the switching elements to be switched is turned ON and a second period in which another one of the plurality of switching elements is turned ON, and outputting the generated signal.

9. The motor driver of claim 8, wherein the ON-period control section comprises:

a torque signal generation circuit for obtaining, according to the torque command signal and the position signal, a first target signal corresponding to a target value of a current that should flow to the current detection resistance during the first period and a second target signal corresponding to a target value of a current that should flow to the current detection resistance during the second period, and outputting the target signals;

a first comparator for determining whether or not the voltage generated at the current detection resistance exceeds the first target signal and outputting the result;

a second comparator for determining whether or not the voltage generated at the current detection resistance exceeds the second target signal and outputting the result; and a logic control circuit for generating the switching control signal according to a reference pulse for defining the period of the switching operation and the outputs of the first and second comparators and outputting the generated signal, wherein the logic control circuit generates the switching control signal so that the first period is terminated when the first comparator determines that the voltage generated at the current detection resistance has exceeded the first target signal and that the second period is terminated when the second comparator determines that the voltage generated at the current detection resistance has exceeded the second signal, and outputs the generated signal.

* * * * *